US012562437B2

(12) United States Patent
Cleary

(10) Patent No.: US 12,562,437 B2
(45) Date of Patent: Feb. 24, 2026

(54) INTERCONNECTION

(71) Applicant: GELION TECHNOLOGIES PTY LTD, Eveleigh (AU)

(72) Inventor: Sean Cleary, Abingdon (GB)

(73) Assignee: Gelion Technologies Pty Ltd, Eveleigh (AU)

( * ) Notice: Subject to any disclaimer, the term of this patent is extended or adjusted under 35 U.S.C. 154(b) by 835 days.

(21) Appl. No.: 17/432,066

(22) PCT Filed: Feb. 18, 2020

(86) PCT No.: PCT/GB2020/050375
§ 371 (c)(1),
(2) Date: Aug. 18, 2021

(87) PCT Pub. No.: WO2020/169956
PCT Pub. Date: Aug. 27, 2020

(65) Prior Publication Data
US 2022/0140450 A1 May 5, 2022

(30) Foreign Application Priority Data
Feb. 19, 2019 (GB) .................................... 1902283

(51) Int. Cl.
*H01M 50/526* (2021.01)
*H01M 10/613* (2014.01)
(Continued)

(52) U.S. Cl.
CPC ....... *H01M 50/526* (2021.01); *H01M 10/613* (2015.04); *H01M 10/653* (2015.04);
(Continued)

(58) Field of Classification Search
CPC .. H01M 10/63; H01M 10/486; H01M 10/613; H01M 10/615; H01M 10/617;
(Continued)

(56) References Cited

U.S. PATENT DOCUMENTS 9,147,875 B1 9/2015 Coakley et al.
11,038,221 B2 6/2021 Takabayashi et al.
(Continued)

FOREIGN PATENT DOCUMENTS

CN 203674296 U 6/2014
DE 10 2016 120 839 A1 5/2018
(Continued)

OTHER PUBLICATIONS

WO2011008736A2, Annacchino et al., "Integrated battery packaging, interconnect, and charge management system", description retrieved from https://worldwide.espacenet.com/ Date: Mar. 28, 2024 (Year: 2011).*
International Search Report and Written Opinion, dated May 29, 2020, corresponding to International Patent Application No. PCT/GB2020/050375.
British Combined Search and Examination Report, dated Sep. 9, 2019, corresponding to GB Application No. GB1902283.9.

*Primary Examiner* — Tiffany Legette
*Assistant Examiner* — Jared Hansen
(74) *Attorney, Agent, or Firm* — BakerHostetler

(57) ABSTRACT

An interconnection for a battery comprising a plurality of cells having connection tabs. The interconnection comprises a first electrically insulating substrate, a heat sink, a plurality of tab-receiving regions, a plurality of aperture and electrically insulating material. The first electrically insulating substrate has a first face on a first side of the interconnection and a second face. The heat sink is thermally connected to the second face of the first substrate. The plurality of tab-receiving regions comprise electrically conducting material on the first side of the interconnection for receiving connection tabs of the cells. The plurality of apertures extend through the interconnection, wherein the apertures are arranged to allow connection tabs of the cells to extend from a second side of the interconnection, through the apertures, and to the first side of the interconnection for establishing contact with the tab-receiving regions on the first side of the interconnection. The electrically insulating
(Continued)

material is arranged to insulate the apertures from the heat sink, such that connection tabs extending through the apertures are electrically insulated from the heat sink.

16 Claims, 6 Drawing Sheets

(51) Int. Cl.
| | |
|---|---|
| *H01M 10/653* | (2014.01) |
| *H01M 50/503* | (2021.01) |
| *H01M 50/509* | (2021.01) |
| *H01M 50/516* | (2021.01) |
| *H01M 50/529* | (2021.01) |

(52) U.S. Cl.
CPC ....... *H01M 50/503* (2021.01); *H01M 50/509* (2021.01); *H01M 50/516* (2021.01); *H01M 50/529* (2021.01); *H01M 2220/20* (2013.01)

(58) Field of Classification Search
CPC ............. H01M 10/653; H01M 10/655; H01M 10/6551; H01M 10/6553; H01M 50/24; H01M 50/503; H01M 50/509; H01M 50/516; H01M 50/521; H01M 50/526; H01M 50/529; H01M 2220/20; H01M 10/425; H01M 50/54; H01M 50/284; H01M 50/519; H01M 2010/4271; Y02E 60/10
See application file for complete search history.

(56) References Cited

U.S. PATENT DOCUMENTS

| | | | | |
|---|---|---|---|---|
| 2009/0323293 A1* | 12/2009 | Koetting | ............. | H01M 50/516 |
| | | | | 29/730 |
| 2010/0247998 A1* | 9/2010 | Hostler | ............. | H01H 85/0241 |
| | | | | 429/120 |
| 2015/0037641 A1* | 2/2015 | Pinon | ................. | H01M 50/517 |
| | | | | 429/99 |
| 2015/0132611 A1 | 5/2015 | Feuillard et al. | | |
| 2016/0028128 A1 | 1/2016 | Limvorapun | | |
| 2016/0073506 A1* | 3/2016 | Coakley | ............. | H01M 50/522 |
| | | | | 156/60 |
| 2016/0315359 A1* | 10/2016 | Tyler | ................... | H01M 50/507 |
| 2019/0074557 A1* | 3/2019 | Shin | ................. | H01M 10/6553 |
| 2019/0109352 A1 | 4/2019 | Krämer | | |
| 2019/0305281 A1* | 10/2019 | Hale | ................... | H01M 10/657 |

FOREIGN PATENT DOCUMENTS

| | | |
|---|---|---|
| GB | 2555408 A | 5/2018 |
| JP | 2011-526731 A | 10/2011 |
| JP | 2015-520925 A | 7/2015 |
| JP | 2016-029643 A | 3/2016 |
| WO | 2011/008736 A2 | 1/2011 |
| WO | 2017/207703 A1 | 12/2017 |
| WO | 2018/078353 A1 | 5/2018 |
| WO | 2017/163336 A1 | 7/2018 |

* cited by examiner

100

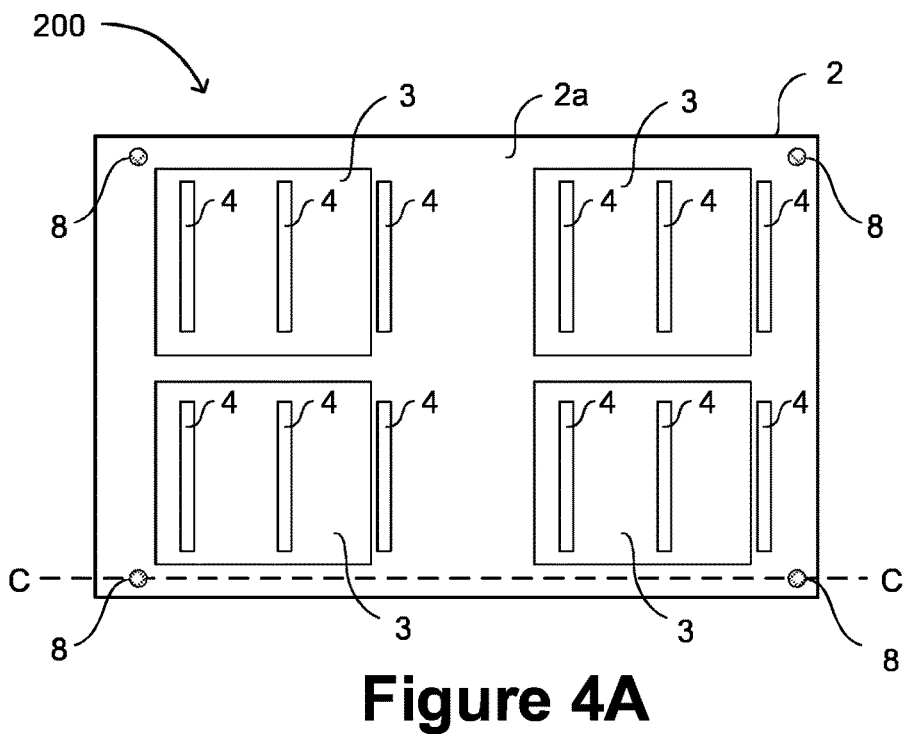
Figure 4A
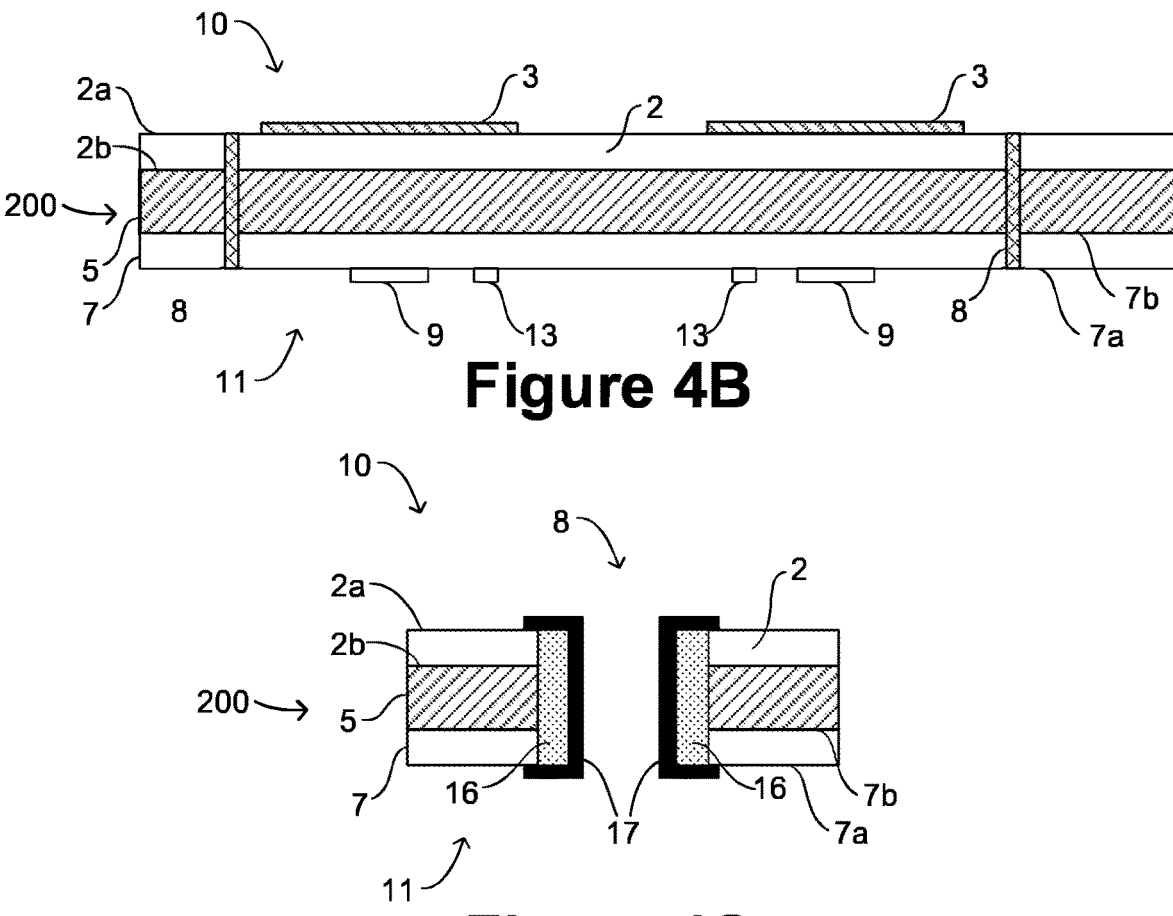
Figure 4B
Figure 4C

INTERCONNECTION

FIELD OF THE INVENTION

The present disclosure relates to an interconnection for a battery comprising a plurality of cells. The present disclosure further relates to a battery comprising a plurality of cells and an interconnection.

BACKGROUND

A typical electrochemical cell comprises an anode, a cathode and an electrolyte disposed between the anode and cathode. The anode, cathode and electrolyte may be contained within a housing, for example, a pouch. Electrical connections, for example, connection tabs may be coupled to the housing to provide electrical connection with the anode and cathode of the cell.

A battery may comprises a plurality of electrochemical cells. The cells may be coupled in series or in parallel, for example, by establishing electrical connections between the cells. Electrical connections between cells may be established by providing an interconnection to which the cells may be electrically coupled.

It is in this context that the subject matter contained in the present application has been devised.

SUMMARY OF THE INVENTION

As was explained above, an interconnection may be provided in a battery in order to establish electrical connections between cells and/or to establish electrical connections between the cells and terminals of the battery. According to aspects and examples presented herein, an interconnection is provided which improves a volumetric efficiency with which cells and an interconnection can be arranged in a battery. Furthermore, aspects and examples are presented herein which facilitate thermal management in a battery.

According to a first aspect of the present disclosure there is provided an interconnection for a battery comprising a plurality of cells having connection tabs, wherein the interconnection comprises: a first electrically insulating substrate having a first face on a first side of the interconnection and a second face; a heat sink thermally connected to the second face of the first substrate; and a plurality of tab-receiving regions comprising electrically conducting material on the first side of the interconnection for receiving connection tabs of the cells, a plurality of apertures extending through the interconnection, wherein the apertures are arranged to allow connection tabs of the cells to extend from a second side of the interconnection, through the apertures, and to the first side of the interconnection for establishing contact with the tab-receiving regions on the first side of the interconnection; and electrically insulating material arranged to insulate the apertures from the heat sink, such that connection tabs extending through the apertures are electrically insulated from the heat sink.

When in use in a battery, the plurality of cells may generally be situated on the second side of the interconnection. For example, at least a housing (e.g. a pouch) enclosing the cathode, anode and electrolyte of each cell may be situated on the second side of the interconnection. Connection tabs of the cells extend through the interconnection in order to establish electrical connection with the interconnection (and each other) on the first side of the cell. By establishing the electrical connections (at the tab-receiving regions) on a different side of the interconnection to the side on which the cells are situated, the volumetric packing efficiency of the battery may be improved. For example, the interconnection may be situated relatively close to the cells, since no extra space is need on the second side of the interconnection in order to arrange the connection tabs.

Furthermore, by providing insulated apertures through which the connection tabs extend during assembly, the safety and integrity of the electrical connections may be improved. For example, during assembly of the battery, the connection tabs and tab-receiving regions may be easily accessible on the first side of the interconnection and not blocked by the main body of the cells (situated on the second side of the interconnection). This may allow the connection tabs to be conveniently and safely attached to respective tab-receiving regions without short circuiting the connection tabs with each other or other components.

Providing a heat sink in the interconnection serves to improve thermal management in the battery and may, for example, serve to efficiently dissipate heat away from one or more cells. For example, the thermal connection between the heat sink and the first electrically insulating substrate may provide an efficient heat path from the cells, through the connection tabs, through the tab-receiving regions, through the first substrate and to the heat sink. In at least some arrangements, the heat sink may be thermally coupled to one or more heat transfer devices, which may further facilitate heat transfer and thermal management of the battery.

The heat sink may additionally or alternatively act to prevent large temperature gradients from establishing in the battery and across the interconnection. For example, during operation of a battery (e.g. charge or discharge of the battery), one or more of the cells of the battery may become hotter than others of the cells. This may be due to differences in the operation conditions of the cells (for example, a difference in the amount of current flowing to/from different cells) or may result from differences in the surrounding conditions of the cells. Consequently, tab-receiving regions (and proximate regions of the interconnection) to which hotter cells are connected may become hotter than tab-receiving regions and regions of the interconnection to which cooler cells are connected, and a temperature gradient may be established across the interconnection.

The heat sink may facilitate efficient heat transfer from one region of the interconnection to another through the heat sink, thereby reducing any temperature gradients which may establish across the interconnection. For example, in the event that one or more regions of the interconnection become heated to a higher temperature than other regions of the interconnection, heat may be efficiently conducted from a relatively hot region to a relatively cool region of the interconnection through the first substrate and the heat sink. The heat sink may therefore act to reduce any temperature gradients across the interconnection and may reduce differences in temperature between different cells in a battery.

As was explained above, providing apertures in the interconnection advantageously allows connection tabs to be extended through the interconnection such that electrical connections can be established on a different side (first side) of the interconnection to a side (second side) on which the cells are situated. Furthermore, providing a heat sink in the interconnection, facilitates efficient thermal management in the battery. In order to facilitate such an arrangement, insulating material is provided in order to provide an insulating shield between the connection tabs and the heat sink. The insulating material advantageously reduces the risk of short circuiting the connection tabs through the heat sink.

The first electrically insulating substrate may have a thermal conductivity of at least 0.1 $W \cdot m^{-1} \cdot K^{-1}$. The thermal conductivity may be at least 0.2 $W \cdot m^{-1} \cdot K^{-1}$, preferably at least 0.5 $W \cdot m^{-1} \cdot K^{-1}$. The thermal conductivity may be at most 6.5 $W \cdot m^{-1} \cdot K^{-1}$, preferably at most 10 $W \cdot m^{-1} \cdot K^{-1}$. In some examples, the thermal conductivity may be 0.6 to 4.8 $W \cdot m^{-1} \cdot K^{-1}$, preferably 1 to 3 $W \cdot m^{-1} \cdot K^{-1}$, more preferably 1.5 to 4 $W \cdot m^{-1} \cdot K^{-1}$. In a preferred example, the thermal conductivity is 2 $W \cdot m^{-1} \cdot K^{-1}$.

The first electrically insulating substrate may be formed of any suitable material. Examples include glass reinforced epoxy materials, for instance, FR-4 and/or G-10.

The first electrically insulating substrate may have a thickness of less than 3 mm, preferably less than 2 mm, more preferably less than 1 mm. In one example, the electrically insulating substrate may have a thickness of 10 microns to 2 mm, preferably 30 microns to 1 mm, more preferably 50 microns to 0.5 or 1 mm. In a preferred example, the substrate has a thickness of 70 to 300 microns, for example, 100 to 200 microns.

The first electrically insulating substrate may be substantially planar. The first face of the first electrically insulating substrate may be opposed to the second face of the first electrically insulating substrate.

The heat sink may be formed of a material having a thermal conductivity of at least 20 $W \cdot m^{-1} \cdot K^{-1}$, preferably at least 50 $W \cdot m^{-1} \cdot K^{-1}$. The thermal conductivity may be at most 500 $W \cdot m^{-1} \cdot K^{-1}$, preferably at most 300 $W \cdot m^{-1} \cdot K^{-1}$. In some examples, the thermal conductivity may be 20 to 500 $W \cdot m^{-1} \cdot K^{-1}$, preferably 50 to 400 $W \cdot m^{-1} \cdot K^{-1}$, more preferably 80 to 300 $W \cdot m^{-1} \cdot K^{-1}$. In a preferred example, the thermal conductivity is 100 to 250 $W \cdot m^{-1} \cdot K^{-1}$.

The heat sink may be in direct contact with the second face of the first electrically insulating substrate. For example, the heat sink may take the form of a metal layer positioned adjacent to and in contact with the first electrically insulating substrate. The heat sink may be formed of any suitable metal. Examples include steel, stainless steel, nickel, copper and aluminium. Preferably, the heat sink comprises a metal, such as aluminium. The heat sink may be any suitable thickness. For example, the heat sink may be 0.1 to 10 mm thick, preferably 0.5 to 5 mm thick, for instance, 1 to 3 mm thick. In a preferred example, the heat sink is 1 to 2 mm thick, for instance, 1.5 mm thick. The heat sink may be thicker than the first electrically insulating substrate. The heat sink may be at least 5 times thicker, for example, at least 10 times thicker than the first electrically insulating substrate.

The plurality of tab-receiving regions may be deposited on the first face of the first electrically insulating substrate. The tab-receiving regions are arranged for connection to the connection tabs of the plurality of cells. For example, the tabs-receiving regions may provide electrical interfaces to which the connection tabs may be coupled. In one example, a plurality of tab-receiving regions are provided, said tab-receiving regions being disposed on the substrate in spaced relation to one another.

Each of these tab-receiving regions or pads may be sized to allow connection to at least one connection tab of a cell. A cell may be connected to the interconnection via one or more tab-receiving region. In one example, the anode(s) of a cell are connected to the interconnection via a connection tab coupled to one tab-receiving region, while the cathode(s) of a cell are connected to the interconnection via a contact tab coupled to a different tab-receiving region. The spacing between the tab-receiving region to which the anode(s) of the cell is attached ("anode pad") and the tab-receiving region to which the cathode(s) of the cell is attached ("cathode pad") may be selected depending on the spacing between the connection tab of the anode(s) and the connection tab of the cathode(s) of the cell.

The tab-receiving regions may be formed of a metal. A suitable metal is copper. In one example, a continuous layer of electrically conducting material (e.g. copper) is deposited over the first face of the first substrate. Thereafter, sections of the layer are etched away, for example, by acid treatment to leave the desired tab-receiving region(s).

The tab-receiving regions may have a thickness of less than 1 mm. In one example, the layer may have a thickness of 1 microns to 1 mm, preferably 5 microns to 0.5 mm, more preferably 10 to 200 microns.

In some examples, the tab-receiving regions are provided (e.g. printed) on the first face of the first electrically insulating substrate as discrete cell-receiving regions or pads.

The thicknesses of the first electrically insulating substrate, tab-receiving regions and heat sink may be selected to optimise the balance between rigidity and weight of the overall construction of the interconnection. Advantageously, the interconnection of the present disclosure is lightweight and rigid. This facilitates the construction of a lightweight battery that may be used in a wide range of applications, for example, a battery for vehicles (e.g. motor vehicles and aircraft).

The apertures extend from the second side of the interconnection to the first side of the interconnection. The apertures may extend through the heat sink. The apertures may have suitable shapes and dimensions to accommodate a connection tab. Each aperture may be arranged to receive a single connection tab. The apertures may be arranged, relative to the tab-receiving regions to facilitate connection of the connection tabs extending through the apertures to the tab-receiving regions. For example, one or more of the apertures may extend through at least part of a tab-receiving region on the first face of the substrate such that the aperture is immediately adjacent to a tab-receiving region on the first side of the interconnection. Alternatively, one or more apertures may be spaced apart from a tab-receiving region on the first face of the first substrate whilst remaining proximate to the tab-receiving region.

The apertures may be arranged and/or spaced apart to facilitate packing of the cells on the second side of the interconnection. For example, the apertures may be arranged such that when connection tabs of a battery's cells are passed through the apertures (for connection to the tab-receiving regions), the cells may be positioned adjacent to one another, for example, as a stack. The cells may or may not be in contact with one another in the stack. In some examples, there may be gaps between the cells that allow air to flow between the cells.

The insulating material provides an insulating barrier between the connection tabs and the heat sinks. The insulating material may be any suitable electrically insulating material. For example, the insulating material may comprise a cured resin such as an epoxy resin.

The interconnection may further comprise a second electrically insulating substrate on the second side of the interconnection. The second electrically insulating substrate may have a first face on the second side of the interconnection and a second face thermally connected to the heat sink.

The second insulating substrate may be similar to the first electrically insulating substrate. For example, any of the properties and materials described herein in connection with the first electrically insulating substrate may also apply to the second electrically insulating substrate. The second insulating substrate may serve to provide a further insulating barrier between the connection tabs and the heat sink. For example, the second substrate may serve to provide an electrically insulating barrier for at least some portions of the heat sink on the second side of the interconnection. Additionally or alternatively, the second substrate may provide a site on which electrical connections and/or electrical circuitry may be positioned. For example, the first face of the second substrate may provide a site for one or more conducting tracks to be situated. The one or more conducting tracks may be arranged to provide electrical connection between one or more tab-receiving regions.

The interconnection may further comprise one or more electrical through-connections extending through the interconnection and providing one or more electrical connections between the first face of the first substrate and the first face of the second substrate.

The through-connections provide electrical connections between components situated on the first substrate and components situated on the second substrate. This may allow electrical circuitry to be disposed on the second substrate and be electrically connected to one or more tab-receiving regions (and thus one or more cells connected to the tab-receiving regions). The one or more through connections may be electrically connected to one or more tab-receiving regions on the first face of the first substrate.

One or more of the through-connections may, for example, connect directly to a tab-receiving region on the first face of the first substrate. For example, a through-connection may be arranged within a tab-receiving region on the first face of the first substrate. Alternatively, a through-connection may be separated from a tab-receiving region on the first face of the first substrate but may be electrically connected to the tab-receiving region. For example, a conductive track may be provided between a through-connection and a tab-receiving region on the first face of the first substrate.

A through connection may take any suitable form. For example, a through connection may comprise an aperture extending through the interconnection and provided with conducting material. For example, the aperture may be coated, lined and/or filled with electrically conducting material such as solder.

The one or more electrical through-connections may extend through the heat sink and may be electrically insulated from the heat sink.

A through-connection may, for example, comprise an aperture extending through the interconnection including the heat sink. The aperture may be provided with insulating material, such as a cured resin (e.g. epoxy resin) in order to shield the aperture from the heat sink. For example, insulating material may be provided in the aperture and between at least the heat sink and electrically conducting material extending through the aperture.

In at least some examples, a through-connection may be formed by forming an aperture in the interconnection. The aperture may subsequently be filled with insulating material. A further aperture may be formed through the insulating material and electrically conductive material may be added to the aperture through the insulating material. The electrically conductive material may extend from the first side of the interconnection to the second side of the interconnection. The electrically conductive material may be insulated from the heat sink by the electrically insulating material.

The one or more electrical through-connections may be arranged to provide electrical connection between one or more of the tab-receiving regions on the first face of the first substrate and the first face of the second substrate.

As was explained above, the through connections may establish electrical connections between the first face of the second substrate and one or more cells via the tab-receiving regions. This may allow components to be situated on the first face of the second substrate and be electrically connected to one or more cells.

The interconnection may further comprise electrical circuitry situated on the first face of the second substrate and connected to at least one of the through-connections thereby establishing electrical connection with at least one of the tab-receiving regions.

The electrical circuitry may comprise electrical circuitry for controlling a state of charge of one or more the cells In some instances, it may be desirable to control the state of charge of one or more of the plurality of cells. This may require one or more of the cells to be discharged. In some examples, it may be desirable to minimise any differences in the state of charge of the cells in the battery.

To control the state of charge, the interconnection may comprise electrical circuitry to control a state of charge of one or more of the plurality of cells. For example, the electrical circuitry may comprise one or more resistors mounted on the first face of the second electrically insulating substrate. The resistors may be connected to the tab-receiving regions by an electrical circuit formed of conductive tracks disposed or imprinted onto the first face of the second electrically insulating substrate an one or more of the through-connection. When cells are connected to the tab-receiving regions, current may be drawn from the cells through these resistors to reduce the state of charge of the cells.

The electrical circuitry may further comprise one or more switches, which may be opened or closed so as to control the flow of current through the one or more resistors. The one or more switches may be coupled to a controller for controlling the state of the switches, thereby controlling the flow of current from the cells and through the resistors. The circuitry may further comprise one or more voltage gauges arranged to measure a voltage across a cell. The controller may be configured to control the flow of current from the cells in dependence on the measurements made by the voltage gauges. For example, a cell having a voltage which is greater than the lowest voltage cell may be connected to a resistor in order to reduce the state of charge of that cell. The state of charge may be reduced so as to bring it into line with the lowest voltage cell, thereby balancing the state of charge of the cells.

In one example, a resistor or collection of resistors may be provided per cell, allowing each cell to be discharged as required. Any heat energy generated by the resistor(s) during this discharge may be conducted to the heat sink (through the second substrate) and dissipated in a convenient manner.

The electrical circuitry may comprise electrical circuitry for controlling a temperature of one or more of the cells.

In some instances, it may be desirable to control the temperature of one or more of the cells. This may require one or more of the cells to be heated or cooled. In some examples, it may be desirable to minimise any differences in the temperature of the cells in the battery. Accordingly, it may be desirable to minimise temperature gradients across the cells in the battery. For example, one or more cells may be selectively heated to minimise temperature gradients in the battery.

To control the temperature of the cells, the interconnection may be provided with electrical circuitry to control the temperature of one or more of the plurality of cells. For example, the interconnection may comprise heaters operable to raise the temperature of one or more cells in the battery. In one example, the interconnection comprises one or more resistors mounted on the first face of the second electrically insulating substrate. A current may be passed through the resistors to generate heat. Preferably, the resistors are positioned at locations opposite to the tab-receiving regions so that heat energy from the resistors can be conducted through the interconnection and to the tab-receiving regions and to the cells via, the connection tabs used to connect the cells to the cell-receiving regions of the substrate. In one example, a plurality of resistors is provided, whereby each resistor is located at a location opposite to a tab-receiving region and each cell is provided with a respective resistor or group of resistors.

Where the anode of a cell is coupled to a cell-receiving region and a cathode of the cell is coupled to another (e.g. proximate) cell-receiving region, one or more resistors may be positioned between the cell-receiving regions. These resistors may be used to control the temperature of the cell and/or to alter its state of charge.

In some examples, the electrical circuitry used to control the state of charge of the cells are the same as the electrical circuitry used to control the temperature of the cells. For instance, the resistor(s) used to control the state of charge of the cells are the same as the resistor(s) used to control the temperature of the cells.

The electrical circuitry used to control the state of charge of the cells and/or the electrical circuitry used to control the temperature of the cells may be controlled by a battery management system that may be coupled to the battery.

The interconnection may include one or more temperature gauges. For example, one or more temperature gauges may be mounted on the first face of the second electrically insulating substrate. The temperature gauges may be distributed over the second electrically insulating substrate to provide a temperature reading indicative of the temperature of one or more of the cells. The temperature gauges may be distributed over the second electrically insulating substrate to provide an indication of any temperature differences between cells. If temperature differences are detected, electrical circuitry may be activated to heat selected cell(s) to reduce any temperature differences that arise.

Any suitable temperature gauge may be employed. For example, a thermometer, bi-metallic strip or a temperature transducer may be employed.

One or more electrical connectors for connection of components other than the cells may be mounted on the first or second substrate. For example, components suitable for measuring voltages (e.g. cell voltages), measuring temperature, providing power (e.g. to power one or more heat sources) and/or controlling one or more components such as switches mounted on the first or second substrate may be connected to one or more connectors mounted on the substrate. A suitable connector may, for example, take the form of an electrical board connector such as those commonly used to establish electrical connection to a PCB. Connectors mounted on the first or second substrate may allow electrical connections to be established with circuitry on the substrate (for example, in the form of conductive tracks on the substrate). For example, electrical connections may be established for the purposes of monitoring and/or controlling circuitry on the substrate.

The electrical circuitry may comprise one or more resistors situated on the first face of the second substrate.

The one or more resistors may be situated opposite at least one tab-receiving region on the first face of the first substrate.

As was explained above, one or more resistors may be used to heat one or more cells. For example, heat generated in a resistor may be conducted through the interconnection and to one or more cells connected to the interconnection. By situating a resistor opposite a tab-receiving region, the resistor may be used to selectively heat the tab-receiving region situated opposite it.

As was explained above, the one or more resistors may be arranged on the second side of the interconnection and the tab-receiving regions are situated on the first side of the interconnection. Heat may be conducted from a resistor on the second side of the interconnection, through the interconnection and to a tab-receiving region on the first side of the interconnection. For example, heat is conducted through the second substrate, the heat sink and the first substrate.

Reference herein to one or more resistors being situated opposite to a tab-receiving region may refer to a resistor being arranged diametrically opposite at least a portion of a tab-receiving region on the opposite side (first side) of the interconnection to the side of the interconnection (second side) on which the resistor is situated.

The interconnection may further comprise one or more temperature gauges arranged to measure a temperature indicative of the temperature of at least one of the cells.

At least a portion of the heat sink may extend beyond the extent of the first substrate such that a portion of the heat sink is exposed.

A portion of the heat sink extending beyond the extent of the first substrate, provides a portion of the heat sink which is exposed (i.e. not covered by the first substrate). An exposed portion of the heat sink may provide a convenient location at which heat can be transferred away from the heat sink. For example, heat be transferred from the exposed portions of the heat sink to air proximate to and/or circulating over the exposed portions.

The interconnection may further comprise a heat-transfer device in thermal contact with the exposed portion of the heat sink and arranged to conduct heat away from the heat sink.

A heat-transfer device may be situated in thermal contact with the exposed portions of the heat sink and arranged to transfer heat away from the heat sink. For example, a heat-transfer device may be placed in physical contact with the exposed portions of the heat sink.

The heat-transfer device may comprise any suitable device for transferring heat away from the heat sink and the interconnection. For example, the heat-transfer device may comprise a device configured to generate a flow of fluid over the exposed portions of the heat sink in order to aid dissipation of heat away from the heat sink. For example, a flow of air may be generated over the exposed portions. Additionally, or alternatively, a liquid coolant may be placed in proximity to the exposed portions (for example, in one or more conduits thermally connected to the heat sink) to allow transfer of heat from the heat sink to the coolant. In some examples, the heat-transfer device may comprise other heat-transfer components such as a heat pipe.

In some examples, the heat sink may be provided with one or more features, such as fins, which serve to increase the surface area of the heat sink and/or to aid the flow of fluid over the heat sink.

The apertures extending through the interconnection may comprise apertures extending through the heat sink. The electrically insulating material may be arranged to line the apertures extending through the heat sink so as to provide an insulating barrier between the heat sink and the apertures extending through the interconnection.

According to a second aspect of the present disclosure there is provided a battery comprising: an interconnection according to the first aspect; and a plurality of cells having connection tabs, wherein the plurality of cells are arranged on the second side of the interconnection, and wherein the connection tabs of the cells extend through the apertures in the interconnection and are attached to the tab-receiving regions on the first side of the interconnection.

The battery may further comprises a heat-transfer device in thermal contact with the exposed portion of the heat sink and arranged to conduct heat away from the heat sink.

The plurality of cells may comprise one or more of lithium sulphur cells, sodium ion cells, lithium ion cells and lithium air cells.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all examples and/or features of any example can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF FIGURES

One or more embodiments of the invention are shown schematically, by way of example only, in the accompanying drawings, in which:

FIGS. 4A-4C are schematic illustrations of an interconnection according to a further example of the present disclosure;

DETAILED DESCRIPTION

Before particular examples of the present invention are described, it is to be understood that the present disclosure is not limited to the particular batteries, interconnections or methods described herein. It is also to be understood that the terminology used herein is used for describing particular examples only and is not intended to limit the scope of the claims.

In describing and claiming the interconnections and batteries of the present invention, the following terminology will be used: the singular forms "a", "an", and "the" include plural forms unless the context clearly dictates otherwise.

Thus, for example, reference to "a battery cell" includes reference to one or more of such elements.

Figure 1:
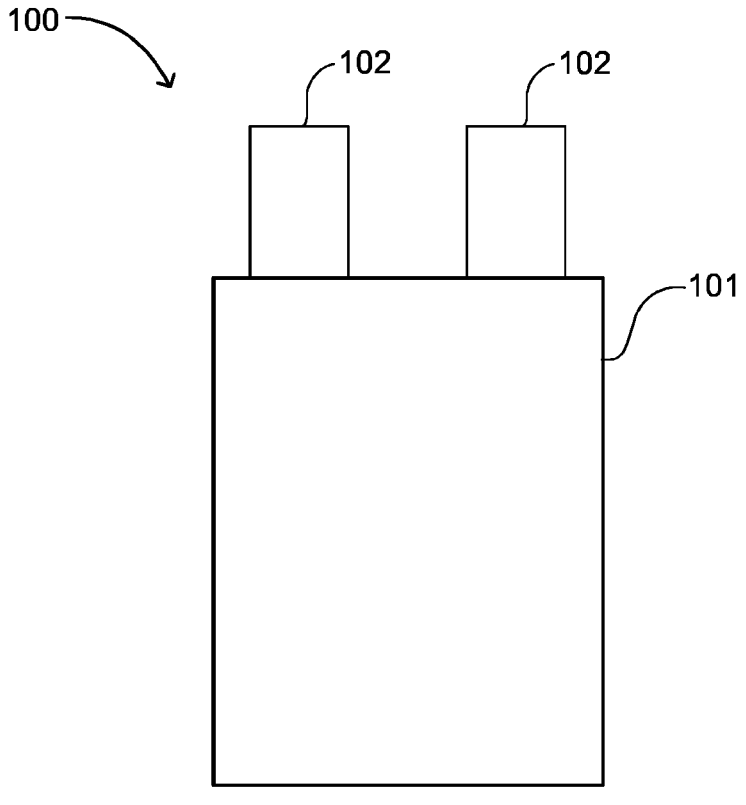
FIG. 1 is a schematic illustration of a battery cell, which may form part of a battery according to the present disclosure.

FIG. 1 is a schematic illustration of a battery cell 100, which may form part of a battery according to the present disclosure. The battery cell 100 is an electrochemical cell and includes a cell housing 101 and connection tabs 102. The housing 101 houses the electrochemical components of the cell. For example, a typical electrochemical cell comprises a cell stack comprising an anode, a cathode and an electrolyte disposed between the anode and the cathode. The cell stack may be contained within the housing 101. The housing may take any suitable form, such as for example, a cylindrical housing. In at least some examples contemplated herein, the housing comprises a pouch, in which the cell stack is sealed. Pouch cells (i.e. a cell in which the housing comprises a pouch) may provide a space efficient cell and may, for example, allow a plurality of cells to be packed adjacent to each other in a space efficient manner.

The connection tabs 102 allow electrical connection to be established with the components of the cell 100. For example, an anode connection tab 102 may be electrically connected to the anode of the cell 100 and a cathode connection tab 102 may be electrically connected to the cathode of the cell 100. The connection tabs 102 may therefore serve as terminals of the cell 100 and may allow electrical connection to be established with the cell 100. For example, electrical connections may be established with the connection tabs 102 in order to allow the cell to be charged and/or discharged through the connection tabs 102.

The connection tabs 102 comprise electrically conductive material. The connection tabs 102 may be constructed such that they are flexible so as to allow the connection tabs 102 to be bent or otherwise deformed. For example, the connection tabs 102 may be formed from relatively thin sheets of conducting material. In some examples, the connection tabs 102 may comprise metal foil.

In general, the cell 101 may be any suitable electrochemical cell. In some examples of the disclosure, the electrochemical cells are lithium cells. Suitable lithium cells include lithium-ion, lithium-air, lithium-polymer and lithium-sulphur cells. In some examples, the electrochemical cells may be sodium ion cells. In generally any suitable battery chemistry may be used.

In some examples, the cell 100 is a lithium-sulphur cell. A lithium-sulphur cell may include a lithium anode and a cathode comprising an electroactive sulphur material. The anode may be formed of lithium metal or a lithium metal alloy. The anode may, for example, comprise a metal foil electrode, such as a lithium foil electrode. The lithium foil may be formed of lithium metal or lithium metal alloy.

A battery according to the present disclosure may comprise a plurality of electrochemical cells 100. For example, a battery may comprise a plurality of cells 100 of the type described above with reference to FIG. 1. A battery comprising a plurality of cells 100 typically includes electrical connections between at least some of the cells 100. For example, electrical connections may be established between cells 100 such that at least some of the cells are connected in series with each other. Additionally or alternatively, electrical connections may be established between cells 100 such that at least some of the cells are connected in parallel with each other. In at least some examples, a battery may include a combination of series and parallel connections between cells. In general, cells may be connected in series with each other in order to increase the voltage of the battery, whereas cells may be connected in parallel with each other in order to increase the capacity of the battery.

Examples of a battery are contemplated herein, which comprise a plurality of cells and an interconnection for establishing electrical connection between the cells. The interconnection may provide electrical connections between the plurality of cells and may provide electrical connection between the cells and terminals of the battery.

Figure 2A:
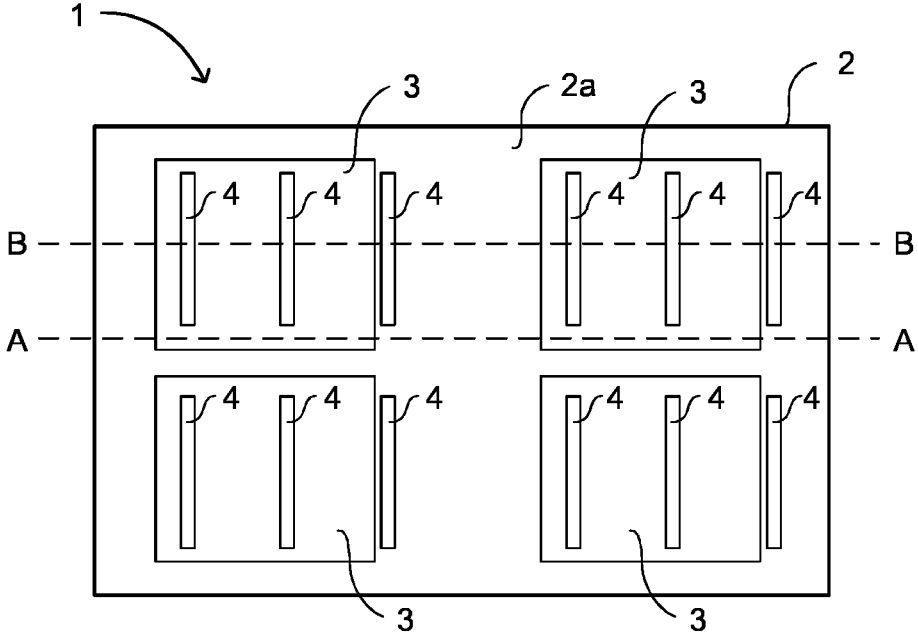
FIGS. 2A-2C are schematic illustrations of an interconnection according to an example of the present disclosure.
Figure 2B:
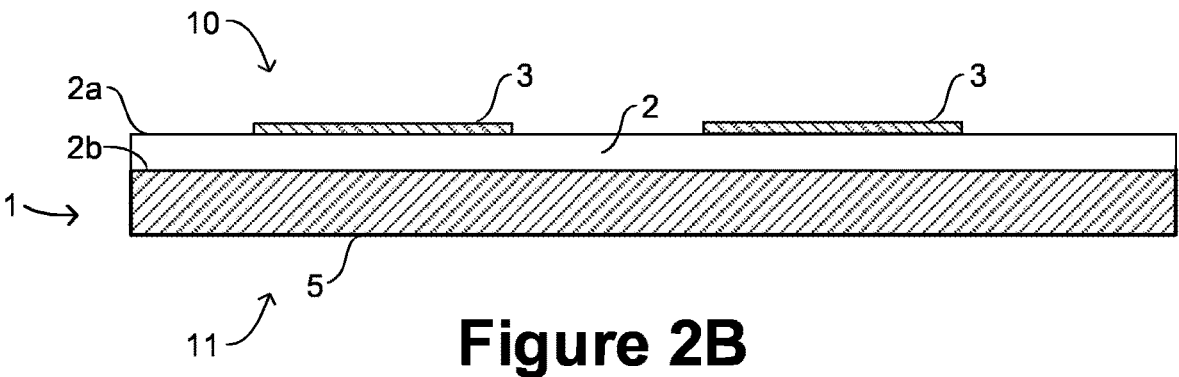
Figure 2C:
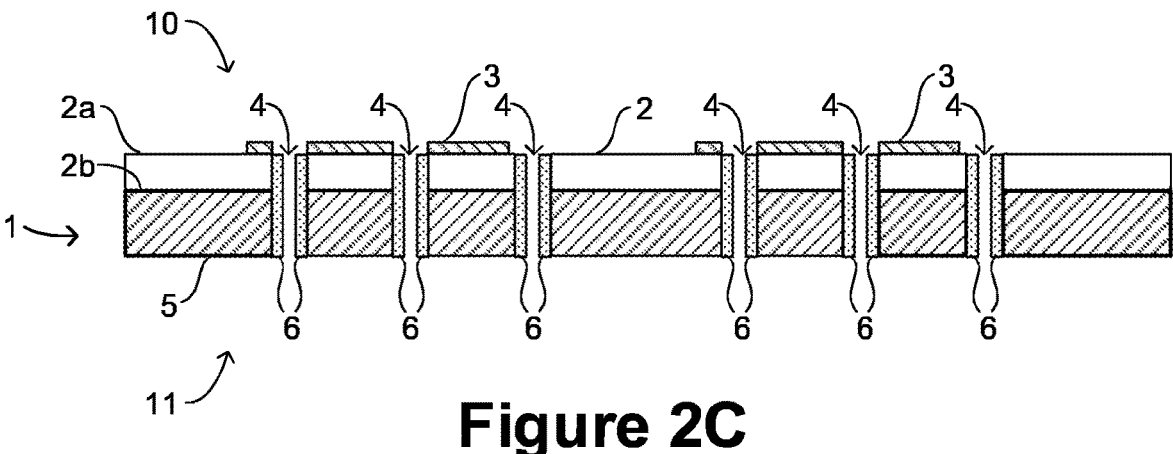

FIGS. 2A, 2B and 2C are schematic illustrations of an interconnection 1 according to examples of the present disclosure. The interconnection 1 is suitable for use in a battery comprising a plurality of cells 100 having connection tabs 102, such as a cell 100 of the form described above with reference to FIG. 1.

FIG. 2A shows a plan view of the interconnection 1 as viewed from a first side 10 of the interconnection 1. FIG. 2B shows a cross-sectional view of the interconnection 1, the cross-section being taken along the line A-A shown in FIG. 2A. FIG. 2C shows a cross-sectional view of the interconnection 1, the cross-section being taken along the line B-B shown in FIG. 2A.

The interconnection shown in FIGS. 2A-2C comprises a first electrically insulating substrate 2. The first substrate 2 has a first face 2a and a second face 2b. The first face 2a is on the first side 10 of the interconnection 1. In the example shown in FIGS. 2A-2C, the first face 2a of the first substrate 2 is situated on an opposing side of the substrate 2 to the second face 2b. The interconnection 1 further comprises a heat sink 5. The heat sink 5 is thermally connected to the second face 2b of the first substrate 2. In the example shown in FIGS. 2A-2C, the heat sink 5 is in contact with the second face 2b of the first substrate 2. However, in other examples, the heat sink 5 may not be directly in contact with the substrate 2 but may still be otherwise thermally coupled to the second face 2b of the first substrate 2. For example, another thermally conductive element may be situated in between the second face 2b of the first substrate 2 and the heat sink 5. In such an example, since heat may be conducted through the thermally conductive element and between the second face 2b of the substrate 2 and the heat sink 5, the heat sink 5 and the second face 2b of the substrate 2 may be considered to be thermally connected.

The heat sink 5 is arranged to act as a passive heat exchanger that allows heat to be dissipated away from one or more components of a battery. For example, as will be described further below when one or more connection tabs 102 are coupled to the interconnection 1, heat generated in the cells 100 may be conducted, through the connection tabs 102, through the interconnection 1 and to the heat sink. The heat sink may comprise a material that is highly thermally conductive. For example, the heat sink may be formed of a material having a thermal conductivity of at least 20 W·m⁻¹·K⁻¹, and in some examples greater than about 50 W·m⁻¹·K⁻¹. In at least some examples the heat sink 5 may be formed from a thermally conductive metal such as aluminium, although other materials may be used.

The interconnection 1 further comprises a plurality of tab-receiving regions 3 comprising electrically conductive material and situated on the first side 10 of the interconnection 1. In the example, shown in FIGS. 2A-2C the tab-receiving regions 3 are situated on the first face 2a of the first substrate 2. The tab-receiving regions are suitable for receiving one of more connection tabs 102 of a battery cell 100. For example, one or more connection tabs 102 may be brought into contact with a tab-receiving region 3 in order to establish electrical connection between the one or more connection tabs 102 and the tab-receiving region 3. When in use in a battery, one or more connection tabs 102 may be attached to the tab-receiving regions 3. For example, one or more connection tabs 102 may be bonded to the tab-receiving regions 3 using any suitable technique which might, for example, include soldering, the use of electrically conductive adhesive and/or welding (e.g. spot welding).

In some examples, a plurality of connection tabs 102 may be connected to a single tab-receiving region 3. In such an example, the tab-receiving region 3 may provide electrical connection between the plurality of connection tabs 102 (by virtue of the electrically conductive properties of the tab-receiving region 3). For example, in order to establish a parallel connection between two cells, anode connection tabs 102 of both cells 100 may be connected to a first tab-receiving region 3 and cathode connection tabs 102 of both cells 100 may be connected to a second tab-receiving region 3. In order to establish a series connection between cells, a cathode connection tab 102 of a first cell 100 and an anode connection tab 102 of a second cell 100 may be connected to the same tab-receiving region 3.

Whilst not shown in FIGS. 2A-2C, the interconnection 1 may further comprise one or more electrical connections between different tab-receiving regions 3. For example, one or more conductive tracks may be situated on the first face 2a of the first substrate 2 and may provide electrical connection between one or more of the tab-receiving regions 3. In general, the interconnection 1 may be configured to establish any suitable connection configuration between cells 100.

In the example shown in FIGS. 2A-2C, the tab-receiving regions 3 are formed from substantially flat pads of conductive material. However, in other embodiments, the tab-receiving regions 3 may comprise any suitably shaped region of conductive material with which electrical connection to a connection tab 102 may be established. The conductive material forming the tab-receiving regions 3 may be formed of a metal, such as copper. To form the tab-receiving regions 3, during manufacture, a continuous layer of electrically conductive material may be deposited on the first face 2a of the substrate 2 (using any suitable technique). For example, a continuous layer of conductive material may be deposited on the entirety of the first face 2a of the substrate 2 or on a discrete region of the first face 2a of the substrate 2. One or more sections of the conductive material may subsequently be etched away to leave the tab-receiving regions 3 and any desired conductive tracks extending between the tab-receiving regions 3 and/or other electrical components.

Whilst not shown in FIGS. 2A-2C, the interconnection 1 may further provide electrical connection between a plurality of cells 100 and terminals of a battery. Terminals of the battery may be used to establish connection with external apparatus, for example, to charge and/or discharge the battery. The battery may be charged and/or discharged through the terminals and via the interconnection 1. For example, a load may be connected to the terminals and the cells 100 may be discharged to the load through the interconnection 1. Additionally or alternatively, a power source may be connected to the terminals and the cells 100 may be charged from the power source and via the interconnection 1.

The interconnection 1 further comprises a plurality of apertures 4 extending through the interconnection 1. FIG. 2C illustrates a cross-section through the interconnection where the cross-section is taken through a portion of the interconnection 1, which includes apertures 4 which extend through the interconnection 1. As can be seen in FIG. 2C, the apertures 4 extend from the first side 10 of the interconnection 1 (on which the first face of the substrate and the tab-receiving regions 3 are situated) to a second side 11 of the interconnection 1. As will be explained in further detail below, the interconnection 1 is arranged for situating a plurality of cells 100 (or at least housings 101 of the cells) generally on the second side 11 of the interconnection 1. The apertures 4 are arranged to allow connection tabs 102 of cells 100 to extend from the second side 11 of the interconnection to the first side 10 of the interconnection 1. The connection tabs 102 may be passed through the apertures 4 in order to establish electrical contact between the connection tabs 102 and the tab-receiving regions 3, on the first side 10 of the interconnection 1.

The interconnection 1 further comprises electrically insulating material 6 arranged to electrically insulate the apertures 4 from the heat sink 5. For example, as is shown in FIG. 2C, the electrically insulated material 6 may be arranged to form an electrically insulating barrier between the apertures and the heat sink 5. It will be understood that the thermally conductive material from which the heat sink 5 is formed (e.g. a metal such as aluminium) may also be, at least partially, electrically conductive. It is therefore desirable to prevent electrical contact between connection tabs 102 extending through the apertures 4 and the heat sink 5. Such electrical contact is prevented by the arrangement of the electrically insulating material 6 in the apertures 4.

In the example, shown in FIGS. 2A-2C (and as seen in particular in FIG. 2C) the insulating material 6 further extends to provide a barrier between the first substrate 2 and the apertures 5. Since the first substrate 2 is electrically insulating, it may generally be unnecessary to provide an electrically insulating barrier between the substrate 2 and the apertures 7. In some examples, the electrically insulating material 6 may not therefore extend to provide a barrier with the first substrate 2 as shown in FIG. 2C. However, providing electrically insulating material 6 which extends throughout the aperture 4 (e.g. providing a barrier with the first substrate 2 as shown in FIG. 2C) may provide for a simpler method of manufacture of the interconnection 1.

The electrically insulating material 6 may be any suitable material for providing an electrically insulating barrier between the apertures 4 and the heat sink 5. The electrically insulating material 6 may, for example, comprise a resin such as cured resin.

Figure 3:
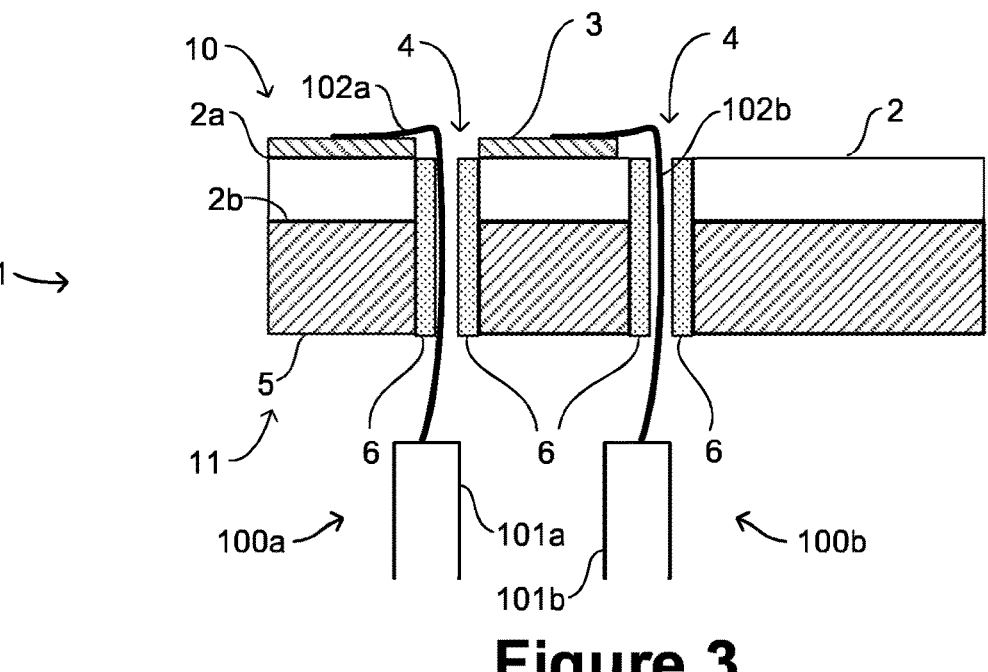
FIG. 3 is a schematic illustration of a portion of an interconnection according to an example of the present disclosure.

As was explained above, the apertures 4 in the interconnection are arranged to allow connection tabs 102 of cells to extend from the second side 11 of the interconnection 1, through the apertures and to the first side 10 of the interconnection 1. FIG. 3 is a schematic illustration of a portion of an interconnection 1 according to an example of the present disclosure. The portion of the interconnection 1 shown in FIG. 3 generally corresponds to the interconnection 1 described above with reference to FIGS. 2A-2C, and like components are labelled with the same refence numerals. No further detailed description of components of the interconnection 1 will therefore be provided again with reference to FIG. 3. The portion of the interconnection 1 which is shown in FIG. 3 includes two apertures 4 extending through the interconnection 1.

Also shown in FIG. 3 is a first cell 100a and a second cell 100b. The first cell 100a includes a housing 101a and a first connection tab 102a. The second cell 100b includes a housing 101b and a second connection tab 102b. The first 100a and second cells 100b are generally situated on the second side 11 of the interconnection 1. For example, the housings 101a, 101b of the cells 100a, 100b are situated on the second side 11 of the interconnection 1. As shown in FIG. 3, the connection tabs 102a, 102b of the cells are arranged to extend from the second side 11 of the interconnection, through the apertures 4 and to the first side 10 of the interconnection 1. By passing the connection tabs 102a, 102b through the apertures, the connection tabs 102a, 102b can establish electrical connections on the first side 10 of the interconnection 1, with the housing 101a, 101b portions of the cells 100a, 100b on the second side 11 of the interconnection 1.

As is shown in FIG. 3, the connection tabs 102a, 102b are received on at least one tab-receiving region 3 on the first side 10 of the interconnection 1. For example, the connection tabs 102a, 102b may be attached or otherwise connected to at least one tab-receiving region 3. As was explained above, a connection tab 102a, 102b may, for example, be bonded to a tab-receiving region 3 using any suitable technique which might, for example, include soldering, the use of electrically conductive adhesive and/or welding (e.g. spot welding).

In the example, shown in FIG. 3, the first connection tab 102a of the first cell 101a is connected to the same tab-receiving region 3 as the second connection tab 102b of the second cell 101b. The tab-receiving region 3 therefore serves to provide an electrical connection between the first connection tab 102a of the first cell 100a and the second connection tab 102b of the second cell 100b (by virtue of the electrical conductivity of the tab-receiving region 3).

As is shown in FIGS. 2A-2C and 3, the apertures 4 may be arranged in proximity to the at least one tab-receiving region 3. Such an arrangement facilitates connection of a connection tab 102 extending through an aperture 4 to a proximate tab-receiving region 3 on the first side 10 of the interconnection 1. For example, an aperture 4 may extend through at least part of tab-receiving region 3 such that the aperture is immediately adjacent to a tab-receiving region on the first side 10 of the interconnection. Alternatively, an aperture 4 may be spaced apart from a tab-receiving region 3 whilst remaining proximate to the tab-receiving region 3.

In general, the tab-receiving regions 3 and apertures 4 may be arranged in such a way as to facilitate the connection of the cells 100, and their respective connection tabs 102, to the tab-receiving regions 3. For example, the tab-receiving regions 3 may be positioned such that they are adjacent to or proximate to the apertures 4. The tab-receiving regions 3 may be located relative to the apertures and have dimensions such as to facilitate connection with the connection tabs 102. For example, the tab-receiving regions 3 may have dimensions such that the connection tabs 102 may be connected to the tab-receiving regions 3 without overlapping with, or coming into contact with, adjacent connection tabs 102. Furthermore, the apertures 4 may be spaced in order to accommodate the cells 100 on the second side 11 of the interconnection 1. For example, the apertures 4 may be spaced in order to facilitate efficient packing of cells 100 on the second side of the interconnection 1 to advantageously increase the volume energy density of the battery.

As mentioned above, the connection tabs 102a, 102b may be formed from a flexible material, which as shown in FIG. 3, allows a portion of the connection tabs 102a, 102b to be bent towards and brought into contact with a tab-receiving region 3 on the first side 10 of the interconnection 1. The connection tabs 102a, 102b may be brought into proximity to and coupled with the tab-receiving regions 3 by any suitable means. For example, the connection tabs 102a, 102b, once extended through the apertures 4, may be bent or otherwise deformed such that they are positioned in contact with, or close proximity to, the tab-receiving regions 3. The connection tabs 102a, 102b may then be coupled to the tab-receiving regions 3 to form an electrical connection between the cells 100 and the interconnection 1. For example, the tabs 102*a*, 102*b* and tab-receiving regions 3 may be coupled by soldering, a conductive adhesive and/or welding, such as ultrasonic welding or laser welding.

As can be further seen in FIG. 3, the insulating material 6 provides an insulating barrier between the connection tabs 102*a*, 102*b* and the heat sink 5 as the connection tabs 102*a*, 102*b* extend through the apertures 4. This may prevent the connection tabs 102*a*, 102*b* from coming into electrical connection with the heat sink 5 and short-circuiting through the heat sink 5.

It will be appreciated that in the example shown in FIGS. 2A-2C and 3, there may be a risk that the connections tabs 102*a*, 102*b* could come in to contact with the exposed surface of the heat sink 5 on the second side 11 of the interconnection 1. For example, during assembly of a battery and when the connection tabs 102*a*, 102*b* are first passed through the apertures 4, there is a risk that the connection tabs 102*a*, 102*b* may come into contact with an exposed portion of the heat sink 5 (e.g. on the second side 11 of the interconnection and in the vicinity of the apertures 4). Such contact between the connection tabs 102*a*, 102*b* and the heat sink 5 may cause the connection tabs 102*a*, 102*b* to short circuit through the heat sink 5. In order to reduce such a risk, in at least some examples, additional insulating material 6 may be arranged on the exposed surface of the heat sink 5 on the second side 11 of the interconnection 1. For example, insulating material may be arranged at least in proximity to the apertures 4 so as to provide an insulating shield between the heat sink 5 and the connection tabs 102*a*, 102*b*. As will be described in further detail below (for example, with reference to FIGS. 4-6) in at least some examples, an interconnection may be provided with a second insulating substrate on the second side 11 of the interconnection, which may provide further insulating shielding of the heat sink 5.

As can be seen, for example, in FIG. 2A, the apertures 4 through the interconnection 1 generally have an elongate rectangular shape such that they are provided in the form of slots. The shape of the apertures 4 may, for example, be arranged to receive the connection tabs 102 and may be shaped so as to approximately correspond to a cross-sectional shape and extent of the connection tabs 102. Whilst the example depicted in FIGS. 2A-2C includes apertures 4 generally in the form of slots, in other examples any suitable arrangement and shape of aperture may be used.

In at least some examples, an interconnection 1 of the type described above with reference to FIGS. 2A-2C and 3 may generally take the form of a printed circuit board (PCB) and in particular a metal-clad PCB. For example, the first electrically insulating substrate may be formed from a corresponding material to those materials typically used to form a substrate in a PCB. In at least some examples, the first substrate 2 may comprise a fibre glass reinforced epoxy resin such as FR-4 and/or G-10.

Electrically conductive material may be added to the first face 2*a* of the substrate 2 to form the electrical connections described above. For example, portions of conductive material may be formed on the first face 2*a* of the first substrate 2 using any suitable PCB manufacturing technique. These may include, for example applying a layer of electrically conductive material such as copper to the first face 2*a* of the first substrate 2 and etching portions of the conductive material to leave one or more conductive portions. Additionally or alternatively, conductive material (e.g. copper) may be selectively applied to the first face 2*a* of the first substrate in order to form a desired arrangement of conductive material. For example, the tab-receiving regions 3 may be formed by selectively applying conductive material to the first face 2*a* of the substrate and/or selectively etching a layer of conductive material. In some examples, the tab-receiving regions 3 may be formed by applying solder to the first face 2*a* of the substrate 2.

As was explained above, the second face 2*b* of the substrate 2 is thermally connected to a heat sink 5. For example, the second face 2*b* of the substrate 2 may be bonded to the heat sink 5, which may comprise a thermally conductive material such as aluminium.

The heat sink 5 may be arranged to facilitate heat transfer in the interconnection 1. Typically, heat may be generated in the cells 100 during use in a battery. For example, during discharge and/or charge of the cells, heat may be generated and the temperature of the cells may rise. In at least some situations it may be desirable to provide a mechanism by which heat can be transferred away from the cells 100 in order to avoid over-heating of the cells during use. For example, heat generated in the cells 100 may be conducted to the heat sink 5. For instance, heat generated within a housing 101 of a cell may be conducted through the a connection tab 102 of the cell and to a tab-receiving region 3, to which the connection tab 102 is attached. By providing a heat sink 5, thermally connected to the substrate 2 on which the tab-receiving region 3 is situated, heat may be efficiently conducted, through the tab-receiving region 3, through the substrate 2 and to the heat sink 5. Such a mechanism may provide for efficient heat dissipation away from the cells, thereby providing thermal management in a battery.

In some operating conditions, the heat sink 5 may additionally act to prevent large temperature gradients from establishing in the battery and across the interconnection 1. For example, during operation of a battery (e.g. charge or discharge of the battery), one or more of the plurality of cells 100 of the battery may become hotter than others of the cells. This may be due to differences in the operation conditions of the cells (for example, a difference in the amount of current flowing to/from different cells) or may result from differences in the surrounding conditions of the cells. For example, a battery may comprise a group of cells 100 situated adjacent to each other on the second side 11 of the interconnection 1. Such a group of cells 100 may include cells situated near to an edge of the group and other cells situated in the middle of the group of cells 100. Those cells situated near to an edge of the group of cells may dissipate some of the heat generated in the cells to their surroundings and may therefore be cooler than other cells in the group. Those cells situated in the middle of the group of cells may be surrounded by other cells, and may not therefore be able to efficiently dissipate heat to their surroundings. Consequently, those cells situated near to the middle of the group may become hotter than those cells situated near to the edge of the group. Consequently, tab-receiving regions 3 (and proximate regions of the interconnection 1) to which hotter cells are connected may become hotter than tab-receiving regions 3 and regions of the interconnection 1 to which cooler cells are connected, and a temperature gradient may be established across the interconnection 1.

During operation it is often desirable for each of a plurality of cells 100 in a battery to be held at approximately the same temperature and for large temperature differences between different cells to be avoided. As was explained above, the heat sink 5 may be formed of a material which is highly thermally conductive. Consequently, heat may be efficiently conducted from one region of the interconnection 1 to another through the heat sink 5, thereby reducing any temperature gradients which may establish across the interconnection 1. For example, in the event that one or more regions of the interconnection 1 become heated to a higher temperature than other regions of the interconnection, heat may be efficiently conducted from a relatively hot region to a relatively cool region of the interconnection 1 through the substrate 2 and the heat sink 5. The heat sink 5 may therefore act to reduce any temperature gradients across the interconnection 1 and may reduce differences in temperature between different cells 100 in a battery.

As will be described in further detail below, the heat sink may be thermally coupled to one or more heat transfer devices, which may further facilitate heat transfer and thermal management of the battery.

In addition to the thermal properties provided by the heat sink 5, the heat sink 5 may further serve to provide mechanical support to the interconnection 1. For example, the heat sink 5 may improve the rigidity and/or mechanical strength of the interconnection 1.

The apertures 4 may be cut out of the substrate 2 and the heat sink 5, using any suitable manufacturing method. The apertures 4 may be cut out of the substrate 2 and the heat sink 5 at any stage during a manufacturing process. For example, the apertures 4 may be cut out of the substrate 2 and the heat sink 5 separately and before they are brought together to form the interconnection 1 or may be cut out together after the substrate 2 and heat sink 5 have been brought together.

The insulating material 6 may be arranged, for example, by filling apertures extending through the heat sink 5 (and optionally the substrate 2) with insulating material 6. The insulating material 6 may, for example, comprise a cured resin such as an epoxy resin. Apertures may subsequently be formed (e.g. machined or otherwise cut out) in the insulating material 6 so as to provide the apertures 4 extending through the interconnection. In this way (or through any other suitable method of manufacture) the insulating material 6 may be arranged to line apertures extending through heat sink 5, such that the insulating material 6 provides an insulating barrier between the heat sink 5 and the apertures 4 extending through the interconnection 1.

As was explained above, the apertures 4 through the interconnection 1, allow connection tabs 101 of cells 100 situated on a second side 11 of the interconnection 1 to extend through the interconnection 1 and be connected to tab-receiving regions 3 arranged on a first side 10 of the interconnection 1. As will be explained in further detail below, such an arrangement may have particular advantages in relation to the volumetric packing efficiency of a battery, the electrical safety of the connections established at the interconnection 1 and/or ease and safety of assembly of the battery.

Whilst an example of an interconnection 1 according to the present disclosure has been described above with reference to FIGS. 2A-2C and 3, in some examples according to the present disclosure, additional or alternative components and arrangements may be provided in an interconnection. FIGS. 4A, 4B and 4C are schematic illustrations of an interconnection 200 according to a further example of the present disclosure. FIG. 4A shows a plan view of the interconnection 200 as viewed from a first side 10 of the interconnection 200. FIG. 4B shows a cross-sectional view of the interconnection 200, the cross-section being taken along the line C-C shown in FIG. 4A. FIG. 4C shows a more detailed view of a portion of the cross-section of FIG. 4B.

The interconnection 200 shown in FIGS. 4A-4C includes many of the same components and features as the interconnection 1, which was described above with reference to FIGS. 2A-2C and 3. Corresponding components of the interconnection 200 shown in FIGS. 4A-4C are denoted with the same reference numerals as those used in FIGS. 2A-2C and 3. No further detailed description of these corresponding components will therefore be provided with reference to FIGS. 4A-4C. For example, the interconnection 200 shown in FIGS. 4A-4C includes apertures 4, which extend though the interconnection 200 in a corresponding manner to the apertures 4 described above with reference to FIGS. 2A-2C. Accordingly no cross-section through the interconnection 200 and taken through the apertures 4, is presented in connection with the interconnection 200 of FIGS. 4A-4C. It will be readily appreciated that such a cross-section would have a similar form to the cross-section of FIG. 2C (with the addition of a second substrate 7 on the second side 11 of the interconnection 200). Any features and/or teachings described above with reference to FIGS. 2A-2C and 3 may equivalently apply to the example interconnection 200 depicted in FIGS. 4A-4C.

The interconnection 200 which is shown in FIGS. 4A-4C is distinguished from the interconnection 1 of FIGS. 2A-2C and 3 by virtue of the addition of a second electrically insulated substrate 7. The second substrate 7 is situated on the second side 11 of the interconnection 200. In particular, the second substrate 7 includes a first face 7a on the second side 11 of the interconnection 200 and a second face 7b thermally connected to the heat sink 5. In the example shown in FIGS. 4A-4C, the second face 7b of the second substrate 7 is in contact with the heat sink 5. However, as was described above with reference to the second face 2b of the first substrate 2, other arrangements may be adopted in which the second face 7b of the second substrate is still thermally connected to the heat sink 5 without being in direct contact with the heat sink 5. For example, another thermally conductive element may be situated in between the second face 7b of the second substrate 7 and the heat sink 5. In such an example, since heat may be conducted through the thermally conductive element and between the second face 7b of the second substrate 7 and the heat sink 5, the heat sink 5 and the second face 7b of the second substrate 7 may be considered to be thermally connected.

The second substrate 7 may share one or more properties described above with reference to the first substrate 2. For example, the second substrate 7 may comprise a material commonly used for the construction of a PCB, such as a fibre glass reinforced epoxy resin (e.g. FR-4 and/or G-10). Furthermore, electrically conductive material may be disposed on the first face 7a of the second substrate 7 in a similar manner as was described above with reference to the first face 2a of the first substrate 2. For example, conductive tracks may be formed on the first face 2a of the first substrate 2 (e.g. using an additive or subtractive process) In at least some examples, the interconnection 200 may have a similar construction to a double-sided PCB.

The first substrate 2 and/or the second substrate 7 may be relatively thin and may, for example, have a thickness of less than about 3 mm and in many embodiments may be significantly less than 3 mm. Providing a relatively thin substrate advantageously facilitates conduction of heat through the substrate and additionally allows the interconnection 200 to have a compact and lightweight construction.

As was mentioned above, the second substrate 7 is electrically insulating and thus provides a further insulating barrier with the heat sink 5. For example, the second substrate 7 may provide electrical insulation between cells 100 and the heat sink 5. In at least some examples, the second substrate 2 may further allow electrical circuitry to be provided on the second side 11 of the interconnection 200, whilst remaining electrically insulated from the heat sink 5. For example, electrical circuitry may be provided on the first face 7a of the second substrate 7. Electrical circuitry on the first face 7a of the second substrate may be connected to components (e.g. tab-receiving regions 3) on the first face 2a of the first substrate 2 by way of one or more electrical through-connections 8 extending through the interconnection 200. The one or more through-connections 8 provide one or more electrical connections between the first face 2a of the first substrate 2 and the first face 7a of the second substrate 7. In particular, the through-connections 8 may be arranged to provide electrical connection between one or more of the tab-receiving regions 3 on the first surface 2a of the first substrate 2 and the first surface 7a of the second substrate 7. For example, a through-connection 8 may be electrically connected to one or more tab-receiving regions 3, either directly or through a conducting track on the first surface 2a of the first substrate 2.

As is shown, for example in FIGS. 4B and 4C, a through-connection 8 may extend through the heat sink 5 whilst be electrically insulated from the heat sink 5. A more detailed view of an example implementation of a through-connection 8 is shown in FIG. 4C. The example through-connection 8 includes an aperture which extends through the heat sink 5 and the first 2 and second 7 substrates. The aperture is lined with insulating material 16, which may, for example, comprise a resin such as an epoxy resin. In this regard, the aperture forming the through-connection 8 may be similar to the apertures 4 described above, for passing connection tabs through the interconnection. The through-connection 8 further comprises electrically conducting material 17, which lines (or plates) the aperture extending through the interconnection 200. The electrically conducting material 17 may, for example, comprise a solder material inserted into the aperture in the interconnection 200. Whilst the electrically conductive material 17 is depicted in FIG. 4C as lining or plating the aperture in the interconnection 200, in some examples, the electrically conductive material 17 could entirely fill the aperture extending through the interconnection 200.

The electrically conductive material 17 may be connected to components situated on the first 2 and second 7 substrates so as to establish an electrical connection between the first face 2a of the first substrate 2 and the first face 7a of the second substrate 7. The electrically conductive material 17 is insulated from the heat sink 5 by the insulating material 16, thereby preventing short-circuiting of the connection through the heat sink 5.

As will be appreciated, for example from the example shown in FIG. 4C, a through-connection 8 allows an electrical connection to be established between the first 10 and second 11 sides of the interconnection 200. For example, electrical circuitry situated on the first face 7a of the second substrate 7 may be electrically connected to at least one through-connection 8. The at least one through connection 8 may be connected to one or more tab-receiving regions 3 situated on the first side 10 of the interconnection 200, thereby establishing electrical connection between the electrical circuitry and the one or more tab-receiving regions 3.

Electrical circuitry situated on the first face 7a of the second substrate may be provided for a variety of different purposes. In at least some examples, the electrical circuitry may comprise electrical circuitry for controlling a state of charge of one or more cells 100 connected to the interconnection 200. Additionally or alternatively, the electrical circuitry may comprise electrical circuitry for controlling a temperature of one or more cells 100 connected to the interconnection 200.

In some embodiments, active thermal management may be provided in the battery. For example, the interconnection 200 may include electrical circuitry to control the temperature of one or more of a plurality of cells 100 connected to the interconnection 200. In the example shown in FIG. 4B, electrical circuitry for controlling the temperature of the plurality of cells 100 includes resistors 9 mounted on the second substrate 8 on the second side 11 of the interconnection 200. Each of the resistors 9 may be positioned at a location on the second substrate 7 which is opposed to a tab-receiving region 3 on the first side 10 of the interconnection 200. Heat generated in a resistor 9 may therefore cause heating of one or more opposing tab-receiving regions 3 (e.g. due to conduction of heat through the substrates 2, 7 and the heat sink 5 from the resistor 9 to the tab-receiving region 3). Positioning a resistor 9 on the second side 11 of the interconnection 9 and opposed to a tab-receiving region 3 may provide particularly efficient heat transfer from the resister 9 to the tab-receiving region 3, through the heat sink 5. For example, heat transfer through the interconnection 200 from a resistor 9 positioned on the second side 11 of the interconnection 1 to a tab-receiving region 3 on the first side 10 of the interconnection 200 may be greater than if the resistor 9 was instead positioned adjacent to, and on the same side of the interconnection 200 as, a tab-receiving region 3.

A cell 100 connected to a heated tab-receiving region 3 may receive heat by conduction through the tab-receiving region 3 and a connection tab 102 connected to the tab-receiving region 3. The resistors 9 may therefore be used to provide localised heating to regions of the interconnection 1 in order to heat one or more cells connected to the interconnection 1.

As shown in the Figures the resistors 9 are provided at different locations on the second substrate 8 such that different resistors 9 provide heating to different regions of the interconnection 1. Different resistors 9 may therefore provide heating to different tab-receiving regions 3 and thus different cells connected to the tab-receiving regions 3. In this way the resistors provide controllable and localised heating to the interconnection 1. Other suitable arrangements of the resistors than those depicted in the Figures may be envisaged.

Heating of one or more cells 100 or tab-receiving regions 3 by a resistor 9 may be controlled by controlling the electrical current flowing through the resistor 9. For example, in the event that heating of a cell 100 is desired, a potential difference may be connected across a resistor 9 located opposite a tab-receiving region to which the cell is connected, in order to generate current through the resistor 9, thereby causing the resistor 9 to be heated.

In some examples, the resistors 9 may be electrically connected to the cells 100. For example, the resistors 9 may be connected across one or more cells 100 via connection tabs 102 connected to tab-receiving regions 3 on the interconnection 200. The tab-receiving region may be connected to a resistor via the through-connections 8 and optionally a conductive track on the second substrate 7. Connection of a resistor 9 to a tab-receiving region 3 allows current to be drawn from one or more cells 100, connected to the tab-receiving region 3, and through the resistor 9. The one or more connected cells 100 may therefore function as a power source for the resistors 9.

Whilst the connected cells 100 provide a convenient power source, which may be used to drive a current through a resistor 9 and provide localised heating to the interconnection 200, any electrical power source may be used to drive a current through a resistor 9. For example, one or more of the resistors 9 may be connected across a separate power source (not shown), which is provided for the purposes of providing localised heating to the interconnection 200.

The resistors 9 may be connected in series with one or more switches (not shown) which may be opened and closed in order to control the flow of current through the resistors 9 and thereby control the heating provided to the interconnection 200. The flow of current may be controlled by any suitable control circuitry. For example, the interconnection 1 may comprise a controller (e.g. in the form of a microprocessor) arranged to control the flow of current through one or more of the resistors 9. The controller (not shown) may be mounted on the first substrate 2, the second substrate 7 or may be situated separately. The controller may be connected to circuitry situated on one or more of the substrates 2, 7 (e.g. in the form of one or more resistors 9 and/or one or more switches) via a connection provided on the interconnection 200. The connection may comprise any suitable interface (e.g. a socket) for connection of one or more external components, such as a controller. The connection may be connected to circuitry on the second substrate 7 via one or more conductive tracks (not shown), which extend across the substrate 7.

In some examples, heating of the interconnection 200 may be controlled dependent on one or more temperature measurements. In the example shown in FIG. 4C, the interconnection 200 is provided with a plurality of temperature gauges 13 mounted on the second side 11 of the interconnection 200 and on the second substrate 7. The temperature gauges 13 may be positioned on the second side 11 of the interconnection 200 opposing the tab-receiving regions 3 on the first side 10 of the interconnection 200. The temperature gauges 13 may therefore provide temperature measurements, which are indicative of the temperature of the tab-receiving regions 3 and thus the temperature of the cells (since the cells are thermally coupled to the tab-receiving regions 3 via thermally conductive connection tabs). In particular, the temperature gauges 13 may be arranged such that measurements made by the temperature gauges 13 provide an indication of any temperature differences between cells connected to different tab-receiving regions 3. However other arrangements of the temperature gauges 13 than those depicted in the Figures may be envisaged.

The temperature gauges 13 may be connected to a controller (not shown) arranged to control the flow of current through the resistors 9. The controller may receive temperature measurements from the temperature gauges 13 and may control the flow of current through the resistors 9 in dependence on the received measurements. For example, if measurements from the temperature gauges 13 indicate that different cells 100 are at different temperatures, current may be caused to flow (e.g. by opening a switch) through one or more resistors 9 thermally coupled to one or more cells, which temperature measurements indicate as being relatively cool when compared to other cells. A relatively cool cell may therefore be heated by the one or more resistors 9 and a temperature difference between different cells may be reduced.

The temperature gauges 13 may comprise any suitable component capable of measuring temperature, for example a thermistor. Whilst heat sources in the form of resistors 9 have been described, in some examples other forms of heat source may be used in order to provide heating to the interconnection 200. In general, any suitable heat source may be used.

As was explained above, in some examples electrical circuitry may be provided (e.g. on the first face 7a of the second substrate 7) for controlling a state of charge of one or more cells connected to the interconnection 200. In a battery comprising a plurality of cells 100, it may be desirable for different cells 100 of the battery to charge and/or discharge at approximately the same rate, such that the state of charge in each of the cells remains balanced. However, over time the state of health and performance of different cells 100 in a battery during charge-discharge cycles may begin to deviate through use. Consequently, a period of operation of a battery, different cells 100 may have differing states of charge. It may therefore be desirable to manage the state of charge of cells in a battery, for example, such that any differences in the state of charge between different cells is reduced.

In some examples, the interconnection 100 is provided with electrical circuitry to control the state of charge of cells 100 of the battery. The circuitry may be arranged to provide passive and/or active control of the state of charge of the cells 100. Passive control of the state of charge of the cells may comprise connecting one or more bypass resistors across one or more cells so as to discharge a cell through a resistor 9, thereby reducing the state of charge of the cell. For example, the electrical circuitry for controlling the state of charge may comprise voltage gauges (not shown) for measuring the voltage (or any other measure indicative of a state of charge) across each cell. Any cell having a voltage which is greater than the lowest voltage cell may be connected to a bypass resistor in order to reduce the state of charge of that cell so as to bring it into line with the lowest voltage cell. The circuitry may therefore further comprise one or more resistors 9 and switches for connecting the resistors 9 across one or more of the cells 100. The resistors 9 may be connected across one or more of the cells 100 by electrically connecting (e.g. via conductive tracks on the second substrate 7 and the through-connections 8) the resistors 9 to one or more of the tab-receiving regions 3, to which the cell connection tabs 102 and cells 100 are connected.

Resistors 9, which form part of electrical circuitry for controlling a state of charge of the cells, may be mounted on the second substrate 7 as shown in FIG. 4B. As current is drawn through the resistors, heat will be generated in the resistors. As was described above, heat generated on the second substrate 7 (e.g. in the resistors) is conducted through the substrate 7 and to the heat sink 5. The heat sink 5 therefore serves to reduce any undesired localised heating which is caused by circuitry for controlling the state of charge of the cells.

In some embodiments, the resistors used for controlling the state of charge of the cells 100 may be the same as the resistors 9 provided for controlling the temperature of the cells. The same electrical circuitry may therefore be used for both controlling the state of charge of the cells 100 and for controlling the temperature of the cells, thereby reducing the required number of components. In other embodiments, electrical circuitry for controlling the state of charge of the cells may be different to electrical circuitry for controlling the temperature of the cells, thereby allowing for independent control of the state of charge and the temperature.

In some embodiments, the circuitry for controlling the state of charge of the cells 100 may additionally or alternatively be configured to provide active control of the state of charge. Active control of the state of charge may comprise transferring charge from one of the cells to another of the cells. For example, charge may be transferred from a cell measured as having a relatively high voltage to a cell measured as having a relatively low voltage, so as to balance the state of charge of the cells. Circuitry for providing active control may comprise, for example, one or more DC converters and/or switched capacitors. Such components (not shown) may be mounted on the second substrate 7 and electrically connected to the cells 100 via the tab-receiving regions 3 (e.g. via conductive tracks on the second substrate 7 and through-connections 8).

In some examples, circuitry for controlling the state of charge of the cells may include a controller (e.g. in the form of a micro-processor). The controller (not shown) may be mounted on the second substrate 7 or may be situated separately from the second substrate 7. The controller may be connected to circuitry situated on the second substrate 7 (e.g. in the form of one or more resistors, switches, DC converters, switched capacitors and/or other components).

A controller for controlling the state of charge of the cells 100 may be the same as or may be different to a controller for controlling the temperature of the cells 100. In some embodiments, a battery management system may be provided for managing one or more properties of the battery such as the state of charge of the cells and/or the temperature of the cells. The battery management system may be coupled to circuitry provided on the interconnection 200.

FIGS. 5A-5D are schematic illustrations of a further example of an interconnection 300 according to the present disclosure. FIG. 6 is a schematic illustration of a battery 500 including the interconnection 300 shown in FIGS. 5A-5D.

The interconnection 300 shown in FIGS. 5A-5D and 6 includes many corresponding components and features to those described above with reference to FIGS. 2A-2C, 3 and 4A-4C. Corresponding components of the interconnection 300 shown in FIGS. 5A-5D and 6 are denoted with the same reference numerals as those used in FIGS. 2A-2C, 3 and 4A-4C. No further detailed description of these corresponding components will therefore be provided with reference to FIGS. 5A-5D and 6. Any features and/or teachings described above with reference to FIGS. 2A-2C, 3 and 4A-4C may equivalently apply to the example interconnection 300 depicted in FIGS. 5A-5D and 6.

Figures 5A, 5B:
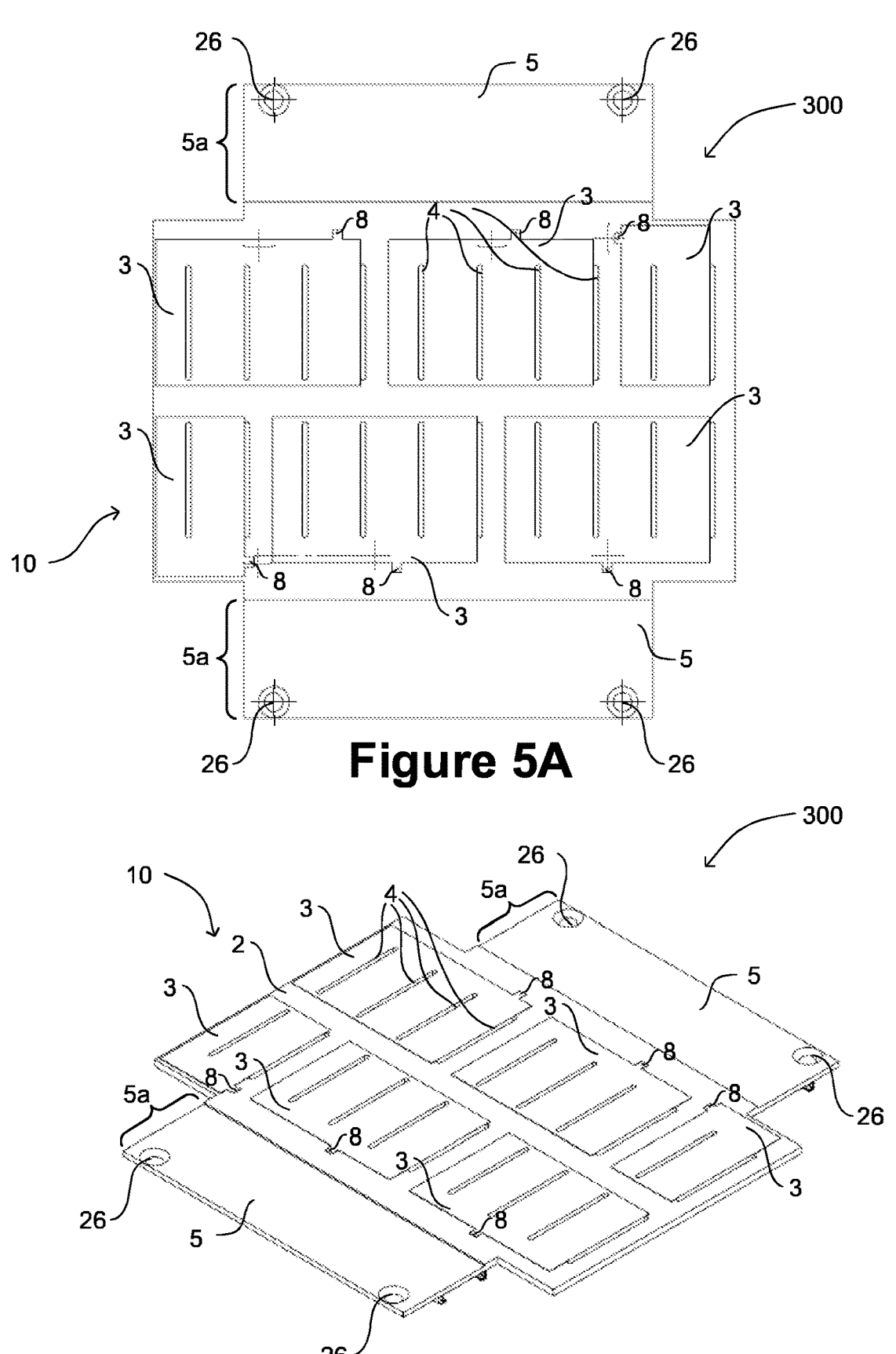
FIGS. 5A-5D are schematic illustrations of an interconnection according to a still further example of the present disclosure.
Figure 5C:
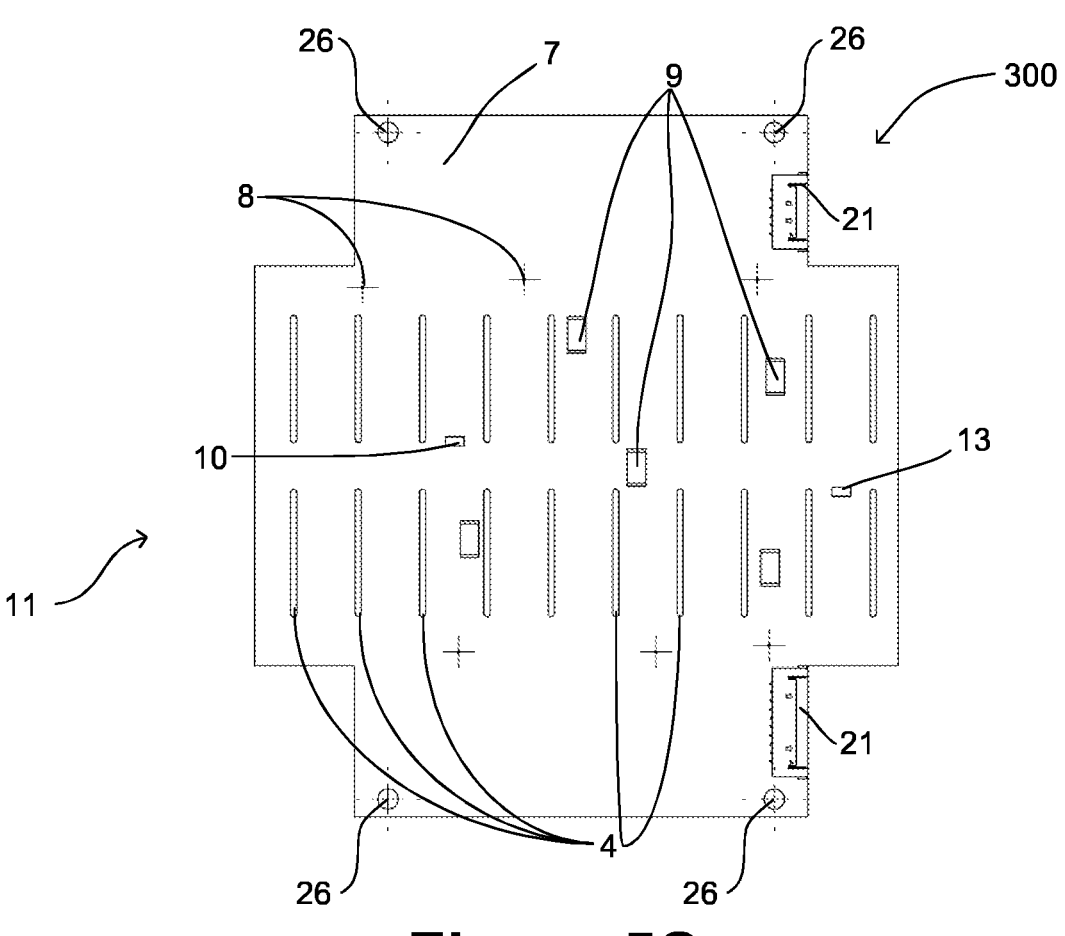
Figure 5D:
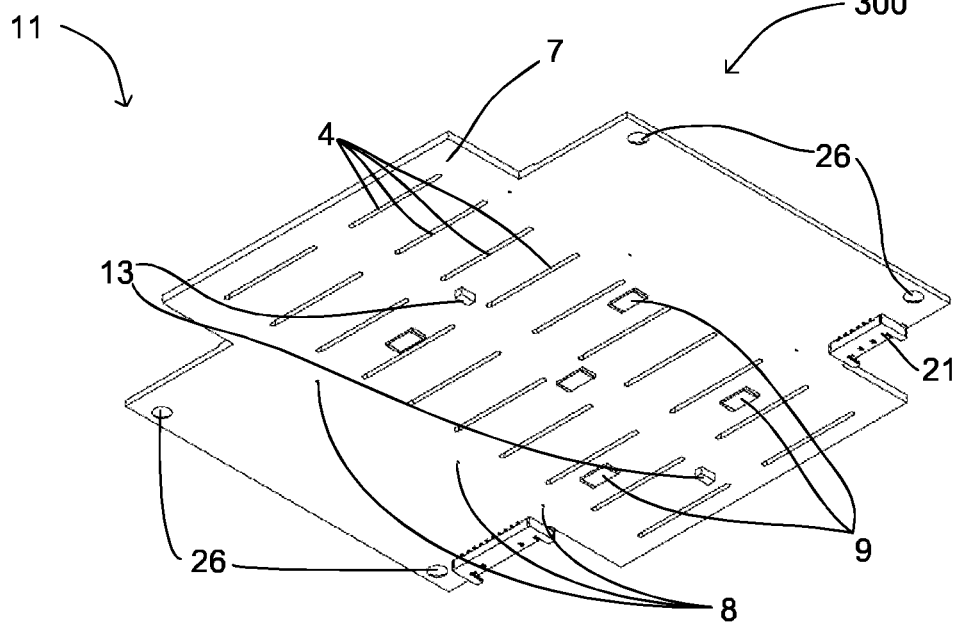
Figure 6:
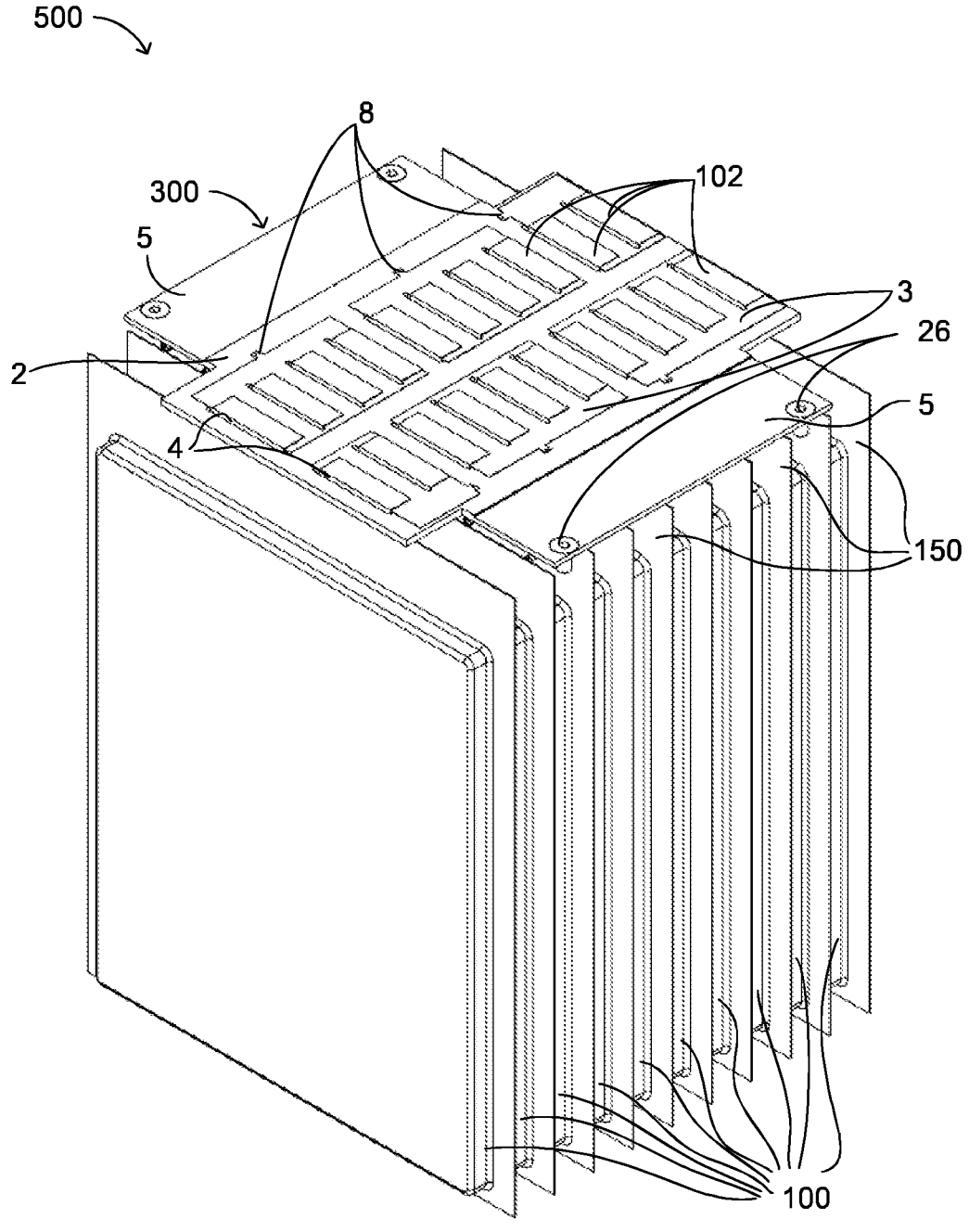
FIG. 6 is a schematic illustration of a battery according to an example of the present disclosure.

FIG. 5A is a plan view of the interconnection 300 as viewed from a first side 10 of the interconnection. FIG. 5B is a perspective view of the interconnection 300 as viewed from the first side 10 of the interconnection. FIG. 5C is a plan view of the interconnection 300 as viewed from a second side 11 of the interconnection. FIG. 5D is a perspective view of the interconnection 300 as viewed from the second side 11 of the interconnection. FIG. 6 is a perspective view of a battery 500 including the interconnection 300 and a plurality of cells 100 connected to the interconnection 300.

The interconnection 300 shown in FIGS. 5A-5D and 6 is generally of the form of interconnection described above with reference to FIGS. 4A-4C. For example, the interconnection 300 includes, a first electrically insulating substrate 2, a heat sink 5 and a second electrically insulating substrate 7. The interconnection 300 further includes a plurality of tab-receiving regions 3 comprising electrically conducting material and situated on the first side 10 of the interconnection 300. In particular, the tab-receiving regions 3 are situated on a first face of the first substrate 2. The interconnection 300 further includes a plurality of apertures 4 extending through the interconnection and arranged to allow connection tabs 102 of the cells 100 to extend from the second side 11 of the interconnection 300, through the apertures 4 and to the first side 10 of the interconnection 300 for establishing contact with the tab-receiving regions 3 on the first side 10 of the interconnection 300. Whilst not visible in FIGS. 5A-5D and 6, the interconnection further includes electrically insulating material arranged to insulate the apertures 4 from the heat sink 5, such that connection tabs 102 extending through the apertures 4 are electrically insulated from the heat sink 5.

In the example shown in FIGS. 5A-5D and 6, the interconnection comprises a total of five tab-receiving regions 3 situated on the first side of the interconnection 10. Each tab-receiving region 3 is situated adjacent to or at least proximate to a plurality of apertures 4. As can be seen in FIG. 6, the apertures 4 and tab-receiving regions 3 are arranged such that connection tabs 102 extending through the apertures can be conveniently connected to a tab-receiving region 3 in order to establish an electrical connection with the tab-receiving region 3. For example, a portion of the connection tabs 102 may be bent or otherwise deformed on the first side of the interconnection 300 so as to bring the connection tabs 102 into electrical contact with the tab-receiving regions 3.

The interconnection further includes a plurality of through-connections 8 for establishing electrical connections between the tab-receiving regions 3 on the first side 10 of the interconnection 300 and the second side 11 of the interconnection 300. In the example shown in FIGS. 5A-5D and 6, the through-connections 8 are situated within a tab-receiving region 3 on the first side 10 of the interconnection so as to establish direct contact with the tab-receiving regions 3. Alternatively, a through-connection 8 may be separated from a tab-receiving region 3 on the first side 10 of the interconnection 300, and electrical contact with the tab-receiving region 3 may be established via one or more conductive tracks on the first substrate 2.

The interconnection 300 further includes electrical circuitry on the second substrate 7. Whilst not specifically illustrated in the Figures, the electrical circuitry is connected to one or more of the through-connections 8 so as to establish electrical connection with a tab-receiving region 3. As was described above, the electrical circuitry may include circuitry arranged to control one or more of the temperature and state of charge of cells connected to the interconnection 300. For example, the electrical circuitry includes resistors 9, which may be arranged for controlling the temperature and/or state of charge of one or more cells connected to the interconnection 300. The electrical circuitry may further include, for example, conductive tracks situated on the second substrate 7 and/or any other suitable components. For example, as shown in FIGS. 5C and 5D, the interconnection 300 may further include temperature gauges 13 for measuring a temperature indicative of the temperature of one or more of the cells 100. The temperatures gauges 13 may, for example, be used to perform active thermal management in the interconnection 300.

In the example, shown in FIGS. 5C and 5D, the interconnection 300 further includes connectors 21. The connectors 21 may be arranged for establishing connection with one or more components situated on the interconnection 300. For example, the connectors 21 may be connected to terminals of the battery 500 and/or may be connected to control circuitry for performing battery management functionality.

As is clearly shown in FIGS. 5A, 5B and 6, the interconnection 300 includes portions 5*a* of the heat sink 5 which extend beyond the extent of the first substrate 2, such that the portions 5*a* of the heat sink are exposed (i.e. not covered by the first substrate 2). The exposed portions 5*a* of the heat sink 5 may facilitate thermal management of the interconnection. For example, the exposed portions 5*a* may allow heat to be dissipated away from the heat sink 5 and the interconnection 300. Heat may, for example, be transferred from the exposed portions 5*a* of the heat sink to air proximate to the exposed portions 5*a*.

Additionally or alternatively, an interconnection according to the present disclosure may further include a heat-transfer device (not shown) in thermal contact with the exposed portions 5*a* of the heat sink 5 and arranged to transfer heat away from the heat sink 5. For example, a heat-transfer device may be placed in physical contact with the exposed portions 5*a* of the heat sink 5. The heat-transfer device may comprise any suitable device for transferring heat away from the heat sink 5 and the interconnection 300. For example, the heat-transfer device may comprise a device configured to generate a flow of fluid over the exposed portions 5*a* of the heat sink 5 in order to aid dissipation of heat away from the heat sink 5. For example, a flow of air may be generated over the exposed portions 5*a*. Additionally, or alternatively, a liquid coolant may be placed in proximity to the exposed portions 5*a* (for example, in one or more conduits) to allow transfer of heat from the heat sink 5 to the coolant. In some examples, the heat-transfer device may comprise other heat-transfer components such as a heat pipe.

In some examples, the heat sink 5 may be provided with one or more features, such as fins, which serve to increase the surface area of the heat sink 5 and/or to aid the flow of fluid over the heat sink 5.

As was explained in detail above, an interconnection 300 may be arranged to provide efficient heat transfer from the cells (e.g. through the connection tabs 102) to the heat sink 5. Such an arrangement may allow simple and efficient thermal management of the battery 500 through the interconnection 300. For example, active thermal management (e.g. active cooling) may be provided at a discrete number of easily accessible locations such as the exposed portions 5*a* of the heat sink 5, to provide thermal management of the entire battery 500.

As further depicted in FIGS. 5A-5D and 6, the interconnection 300 may be further provided with one or more fixing points to facilitate attachment of the interconnection 300 to one or more components of the battery 500. In the example shown in FIGS. 5A-5D and 6, fixing points are provided in the form of holes extending through the exposed portions 5*a* of the heat sink which allows the interconnection to be secured in place in the battery 500.

As is shown clearly in FIG. 6, when incorporated into a battery 500, the interconnection 300 provides connections between a plurality of cells 100. The cells 100 are arranged on the second side 11 of the interconnection 300. Connection tabs 102 of the cells 100 are arranged to extend through the apertures 4 in the interconnection 300 and to connect with the tab-receiving regions 3 on the first side 10 of the interconnection. The battery 500 may be provided with one or more components to fix the cells 100 in position. For example, as shown in FIG. 6, the battery 500 includes a plurality of racks 150 in which the cells 100 may be positioned.

A battery 500 may comprise a number of other components which are not shown in FIG. 6. For example, a battery may further comprise a housing in which the components shown in FIG. 6 are situated. Furthermore, a battery may comprise external terminals for establishing external connections with the battery 500.

As has been described extensively above and can be clearly seen in FIG. 6, an interconnection of the type described herein, allows cells to be situated on a second side 11 of the interconnection 300 whilst electrical connection with the cells is established at tab-receiving regions 3 situated on a first side 10 of the interconnection. As will be appreciated, for example, from FIG. 6 such an arrangement may improve the volumetric packing efficiency of a battery. For example, by providing the tab-receiving regions 3 on an opposing side of the interconnection 300 to the cells 100, the interconnection 300 may be positioned in relatively close proximity to the cells 100, thereby improving the packing efficiency. Furthermore, such an arrangement may facilitate convenient and safe assembly of a battery since the tab-receiving regions 3 and connection tabs 102 extending through the apertures 4 are easily accessible, which may assist with conveniently and safely connecting the connection tabs 104 to the tab-receiving regions 3 during assembly.

As has been further described herein, electrical circuitry (e.g. including one or more conductive tracks) may be provided on the second side 11 of the interconnection 300. This arrangement may provide safety and integrity advantages since the circuitry is not exposed (e.g. during assembly of the battery) by virtue of being shielded by the interconnection 300 itself.

As has been further described herein, the interconnection is provided with a heat sink 5. The heat sink facilitates efficient thermal management in the battery and may for example, facilitate efficient heat dissipation away from the cells and the interconnection 300 (e.g. via exposed portions 5*a* of the heat sink 5). Furthermore, the heat sink 5 may further improve the mechanical strength and/or structural rigidity of the interconnection 300.

Whilst specific examples of an interconnection 1, 300 are shown in the drawings and described above, it will be appreciated that other embodiments of the invention are envisaged. For example, an interconnection according to an embodiment of the invention may include components which are arranged differently from the components shown in the Figures without departing from the scope of the invention. Additionally, or alternatively, an interconnection according to an embodiment of the invention may include more or fewer components than shown in the Figures. For example, in some embodiments an interconnection may include more or fewer tab-receiving regions than the receiving regions 3 shown in the Figures.

It will be appreciated that the Figures are provide merely as schematic illustrations of the apparatus disclosed herein and at least some of the Figures are not presented to scale. For example, at least of the components shown in the Figures may have dimensions which have been enlarged or reduced, relative to other components for ease of illustration and that the relative dimensions of components shown should not be construed to be limiting.

Features, integers, characteristics, compounds or materials described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An interconnection for a battery, the battery comprising a plurality of cells having connection tabs, wherein the interconnection establishes electrical connections between the plurality of cells and/or establishes electrical connections between the plurality of cells and a terminal of the battery, the interconnection comprising:

a first electrically insulating substrate having a first face on a first side of the interconnection and a second face;

a heat sink positioned adjacent to and in direct contact with and along the second face of the first substrate on a second side of the interconnection;

a plurality of tab-receiving regions comprising electrically conducting material on the first side of the interconnection for receiving connection tabs of the cells;

a plurality of apertures extending through the substrate and the heat sink, wherein the apertures are arranged so that the connection tabs of the cells extend from a second side of the interconnection, through the apertures in the substrate and the heat sink, to the first side of the interconnection for establishing contact with the tab-receiving regions on the first side of the interconnection; and electrically insulating material arranged to line the apertures extending through the heat sink so as to provide an insulating barrier between the apertures and the heat sink;

such that connection tabs extending through the apertures of the substrate and heat sink are electrically insulated from the heat sink.

2. The interconnection of claim 1, further comprising a second electrically insulating substrate on the second side of the interconnection, wherein the second electrically insulating substrate has a first face on the second side of the interconnection and a second face thermally connected to the heat sink.

3. The interconnection of claim 2, further comprising one or more electrical through-connections extending through the interconnection and providing one or more electrical connections between the first face of the first substrate and the first face of the second substrate.

4. The interconnection of claim 3, wherein the one of more electrical through-connections extend through the heat sink and are electrically insulated from the heat sink.

5. The interconnection of claim 3, wherein the one or more electrical through-connections are arranged to provide electrical connection between one or more of the tab-receiving regions on the first face of the first substrate and the first face of the second substrate.

6. The interconnection of claim 5, further comprising electrical circuitry situated on the first face of the second substrate and connected to at least one of the through-connections thereby establishing electrical connection with at least one of the tab-receiving regions.

7. The interconnection of claim 6, wherein the electrical circuitry comprises electrical circuitry for controlling a state of charge of one or more the cells.

8. The interconnection of claim 6, wherein the electrical circuitry comprises electrical circuitry for controlling a temperature of one or more of the cells.

9. The interconnection of claim 6, wherein the electrical circuitry comprises one or more resistors situated on the first face of the second substrate.

10. The interconnection of claim 9, wherein the one or more resistors are situated opposite to at least one tab-receiving region on the first face of the first substrate.

11. The interconnection of claim 1, wherein the interconnection further comprises one or more temperature gauges arranged to measure a temperature indicative of the temperature of at least one of the cells.

12. The interconnection of claim 1, wherein at least a portion of the heat sink extends beyond the first substrate such that a portion of the heat sink is exposed.

13. The interconnection of claim 12, wherein the interconnection further comprises a heat-transfer device in thermal contact with the exposed portion of the heat sink and arranged to conduct heat away from the heat sink.

14. A battery, comprising:

an interconnection according to claim 1; and a plurality of cells having connection tabs, wherein the plurality of cells are arranged on the second side of the interconnection, and wherein the connection tabs of the cells extend through the apertures in the interconnection and are attached to the tab-receiving regions on the first side of the interconnection.

15. The battery of claim 14, wherein at least a portion of the heat sink extends beyond the first substrate such that a portion of the heat sink is exposed, and wherein the battery further comprises a heat-transfer device in thermal contact with the exposed portion of the heat sink and arranged to conduct heat away from the heat sink.

16. The battery of claim 14, wherein the plurality of cells comprise one or more of lithium sulphur cells, sodium ion cells, lithium ion cells and lithium air cells.

* * * * *